US007133416B1

(12) United States Patent
Chamdani et al.

(10) Patent No.: US 7,133,416 B1
(45) Date of Patent: Nov. 7, 2006

(54) CONVERTING DATA SIGNALS IN A MULTIPLE COMMUNICATION PROTOCOL SYSTEM AREA NETWORK

(75) Inventors: Joseph I. Chamdani, Santa Clara, CA (US); Matthew S. Rogge, Stanford, CA (US); Peter Gunadisastra, Palo Alto, CA (US); Jayarama N. Shenoy, Fremont, CA (US); Tsuei-chieh Chiu, Fremont, CA (US)

(73) Assignee: McData Corporation, Broomfield, CO (US)

( * ) Notice: Subject to any disclaimer, the term of this patent is extended or adjusted under 35 U.S.C. 154(b) by 1008 days.

(21) Appl. No.: 10/091,916

(22) Filed: Mar. 5, 2002

(51) Int. Cl.
*H04L 12/66* (2006.01)
(52) U.S. Cl. ...................... 370/466; 370/352
(58) Field of Classification Search .............. None
See application file for complete search history.

(56) References Cited

U.S. PATENT DOCUMENTS

| | | | | |
|---|---|---|---|---|
| 5,535,373 A | * | 7/1996 | Olnowich | 703/25 |
| 5,550,820 A | * | 8/1996 | Baran | 370/395.5 |
| 5,933,426 A | * | 8/1999 | Motoori | 370/352 |
| 6,370,155 B1 | * | 4/2002 | Cantwell et al. | 370/465 |
| 6,400,730 B1 | * | 6/2002 | Latif et al. | 370/466 |
| 6,628,652 B1 | * | 9/2003 | Chrin et al. | 370/386 |
| 6,934,301 B1 | * | 8/2005 | Jordan | 370/466 |

OTHER PUBLICATIONS

*Fact Sheet, M-series PICs and FPCs*, Juniper Networks, Inc., 2002, pp. 1-2.
*Install A PIC*, http://www.juniper.net/techpubs/hardware/m5-m10/m5-m5-m10-picinstall4.html, Feb. 15, 2002, pp. 1-2.
U.S. Appl. No. 10/071,969, filed Feb. 5, 2002, entitled "*Processing Data Packets In A Multiple Protocol System Area Network*,", 52 total pages.
U.S. Appl. No. 10/072,581, filed Feb. 5, 2002, entitled "*Forwarding Data Packets In A System Area Network*,", 52 total pages.
U.S. Appl. No. 10/072,059, filed Feb. 5, 2002, entitled "*Transmitting Data Packets In A System Area Network*,", 57 total pages.
U.S. Appl. No. 10/072,060, filed Feb. 5, 2002, entitled "*Communicating Data Packets In A Multiple Protocol System Area Network*,", 52 total pages.

* cited by examiner

*Primary Examiner*—Chau Nguyen
*Assistant Examiner*—Jordan Hamann
(74) *Attorney, Agent, or Firm*—Hensley Kim & Edgington, LLC

(57) ABSTRACT

Converting data signals includes determining whether a coupled interface converter paddle coupled to a serdes is a first interface converter paddle or a second interface converter paddle. The first interface converter paddle is associated with a first communication protocol, and the second interface converter paddle is associated with a second communication protocol. The communication protocol associated with the coupled interface converter paddle is identified. Data signals are received from the coupled interface converter paddle, and deserialized according to the identified communication protocol.

46 Claims, 15 Drawing Sheets

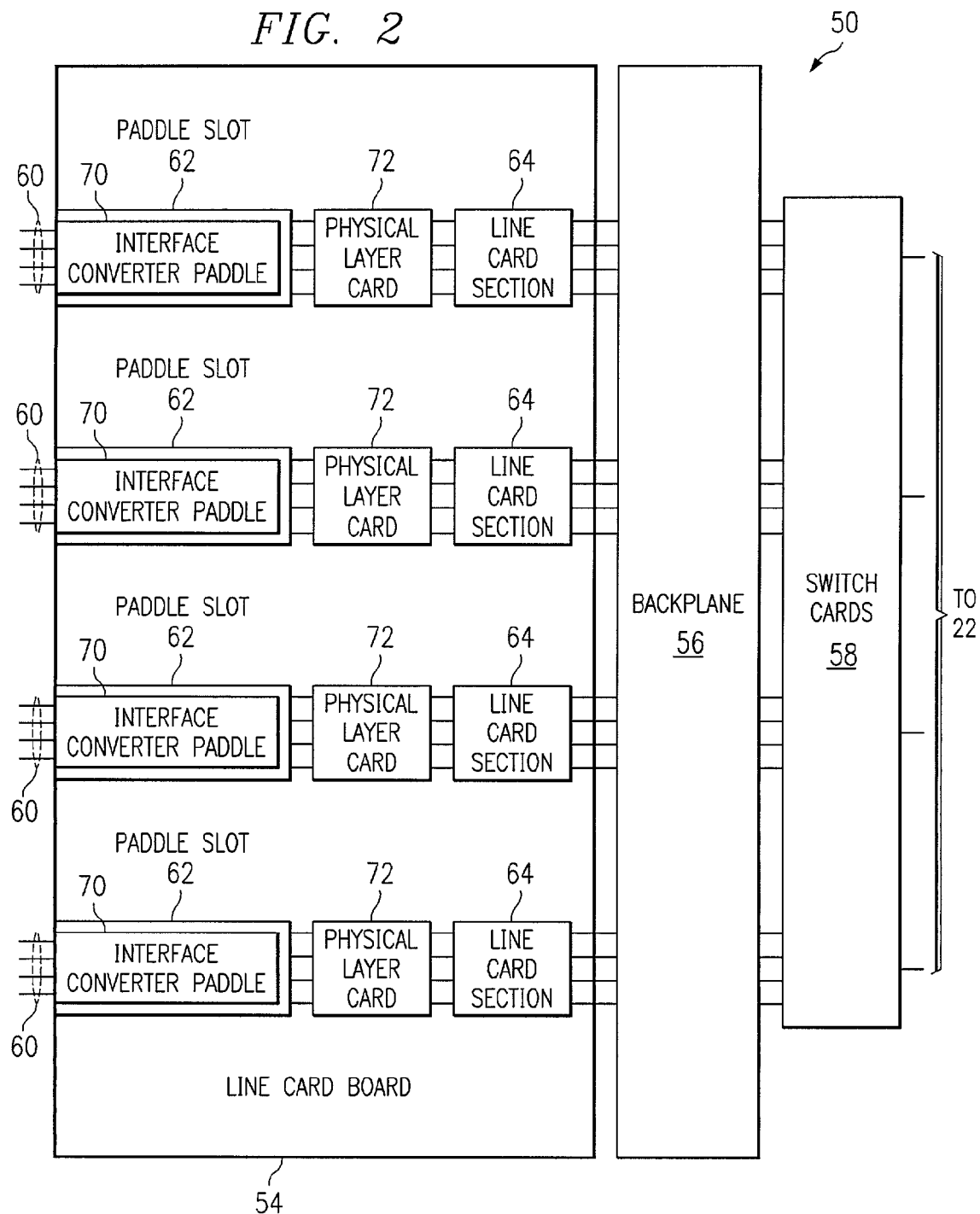

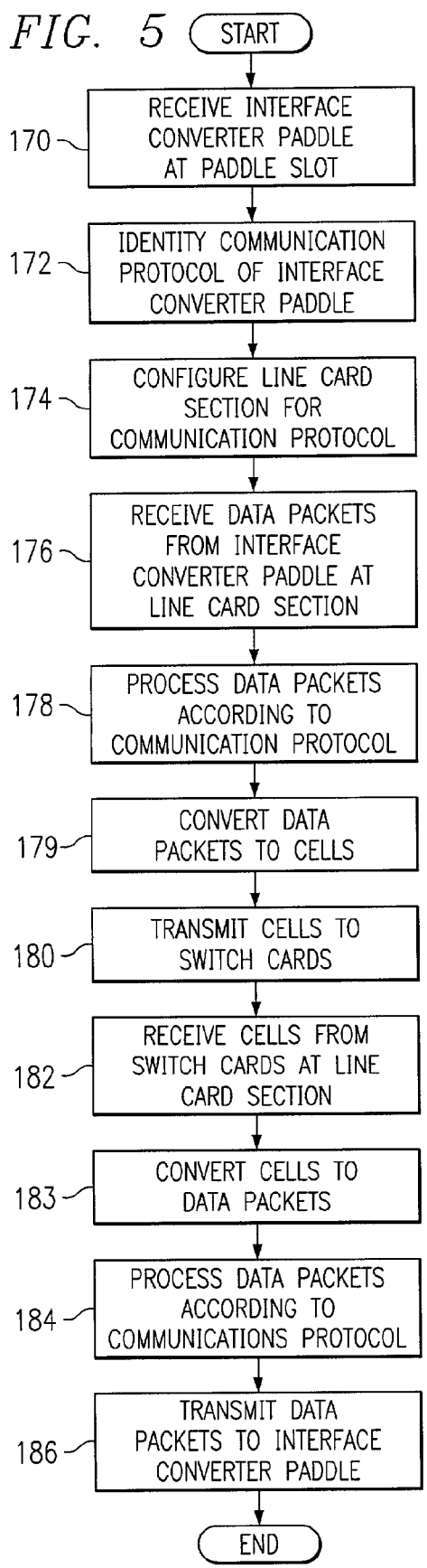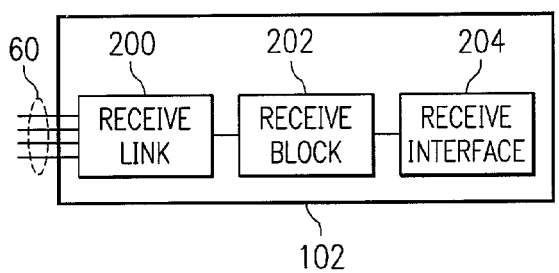

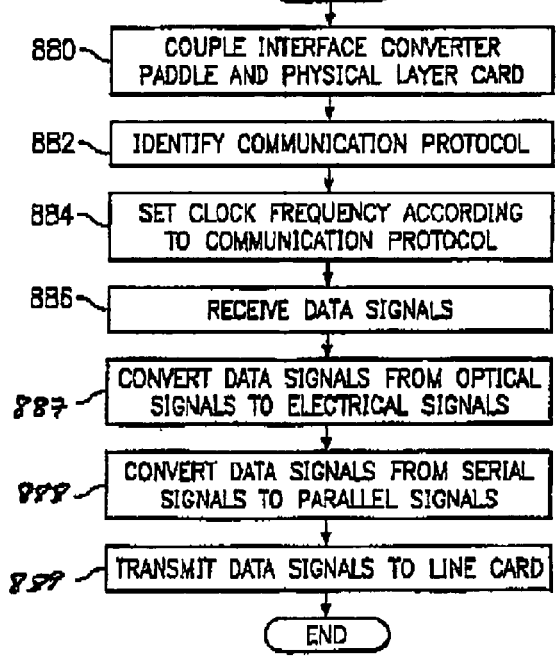
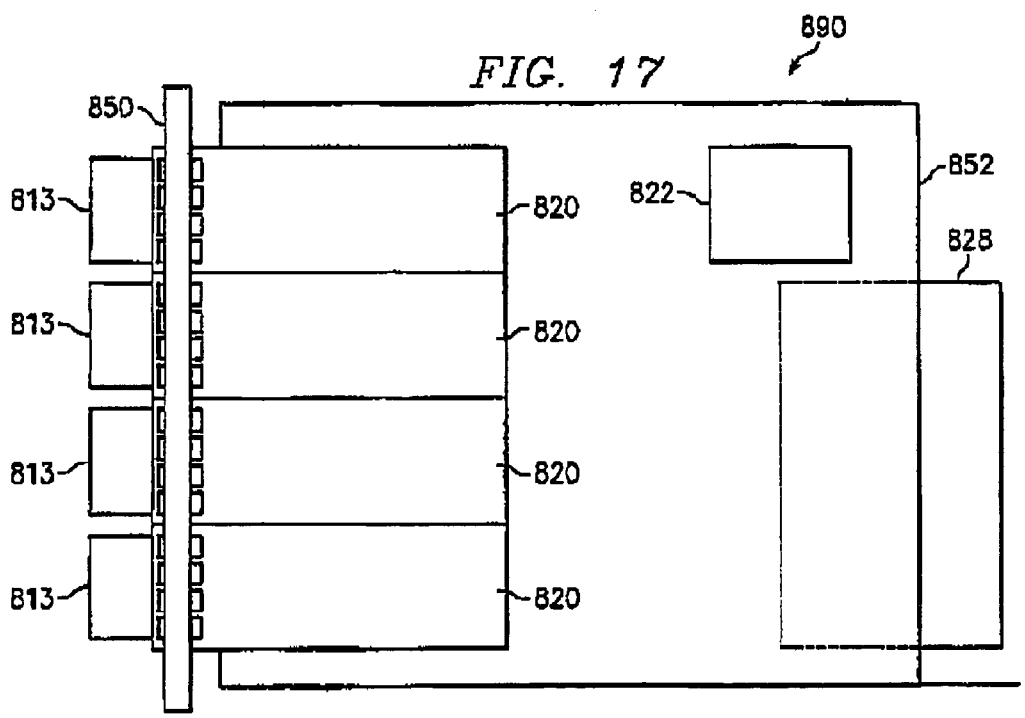

CONVERTING DATA SIGNALS IN A MULTIPLE COMMUNICATION PROTOCOL SYSTEM AREA NETWORK

TECHNICAL FIELD OF THE INVENTION

This invention relates generally to the field of data networks and more specifically to converting data signals in a multiple communication protocol system area network.

BACKGROUND OF THE INVENTION

Storage area networks typically store data from many different sources. Data from different sources, however, are often based on different communication protocols. Consequently, some storage area networks are inadequate for storing data from different sources.

SUMMARY OF THE INVENTION

In accordance with the present invention, disadvantages and problems associated with previously developed techniques are substantially eliminated or reduced.

According to one embodiment of the present invention, converting data signals includes determining whether a coupled interface converter paddle coupled to a serdes is a first interface converter paddle or a second interface converter paddle. The first interface converter paddle is associated with a first communication protocol, and the second interface converter paddle is associated with a second communication protocol. The communication protocol associated with the coupled interface converter paddle is identified. Data signals are received from the coupled interface converter paddle, and deserialized according to the identified communication protocol.

Certain embodiments of the invention may provide technical advantages. A technical advantage of one embodiment may be that interface converter paddles allow for data communication according to any of a number of communication protocols. Interface converter paddles may each convert data signals according to a different communication protocol. Any of the interface converter paddles may be coupled to a physical layer card that can process data signals received from the interface converter card. Thus, the embodiment may provide for processing data according to different communication protocols by interchanging the interface converter paddles. Another technical advantage of one embodiment may be that a board surface controller controls the operations of the interface converter paddle and the physical layer card in order to process data signals according to the different communication protocols. The board surface controller centralizes command functions, which may allow for efficient implementation of changes within the system.

Other technical advantages are readily apparent to one skilled in the art from the following figures, descriptions and claims. Embodiments of the invention may include none, some, or all of the technical advantages.

BRIEF DESCRIPTION OF THE DRAWINGS

For a more complete understanding of the present invention and for further features and advantages, reference is now made to the following description, taken in conjunction with the accompanying drawings, in which:

FIG. 2 is a block diagram illustrating one example of a system for processing data packets;

FIG. 5 is a flowchart illustrating one example of a method for processing a data packet;

FIG. 6 is a block diagram illustrating one example of a receiving control unit;

FIG. 16 is a flow chart illustrating an example of a method for converting data signals;

FIG. 17 is a top view of an example of an interface converter;

DETAILED DESCRIPTION OF THE DRAWINGS

Figure 1:
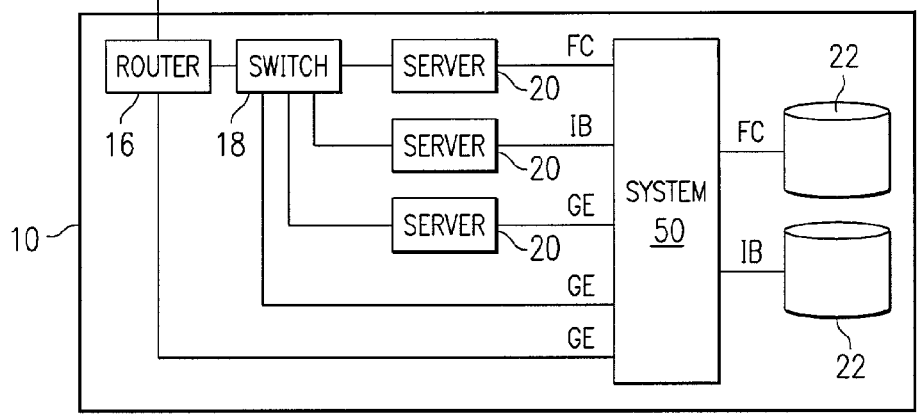
FIG. 1 is a block diagram illustrating one example of a system area network for communication and storing data.

FIG. 1 is a block diagram illustrating one example of a system area network 10 for communicating and storing data.

System area network 10 provides for the communication and storage of data based on any of a number of communication protocols of any suitable type, for example, InfiniBand (IB), Gigabit Ethernet (GE), or Fibre Channel (FC) of any suitable speed, for example, 1 G, 2 G, or 10 G.

One or more remote devices 12 communicate with system area network 10 through a communications network 14. Remote devices 12 may include appropriate input devices, output devices, storage media, processors, memory, or other devices for receiving, processing, storing, and communicating data such as a computer. As used in this document, the term "computer" refers to any suitable device operable to accept input, process the input according to predefined rules, and produce output, for example, a personal computer, workstation, network computer, wireless data port, wireless telephone, personal digital assistant, one of more processors within these or other devices, or any other suitable processing device.

Communications network 14 may include a public switched telephone network (PSTN), a public or private data network, the Internet, a wired of wireless network, a local, regional, or global communications network, or any other network suitable for communicating data to system area network 10. Communications network 14 communicates data to a router 16, which in turn may communicate data to a switch 18 of to a system 50 for processing data packets. Switch 18 may communicate data to one of more servers 20 or to system 50.

System 50 communicates with router 16, switch 18, and servers 20, which may each support a different communication protocol. "Each" as used in this document refers to each member of a set or each member of a subset of the set. For example, router 16 and switch 18 may use a Gigabit Ethernet communication protocol of suitable speed, while servers 20 may use Fibre Channel, InfiniBand, or Gigabit Ethernet communication protocol of suitable speed. System 50 stores and retrieves data in one or more databases 22. System 50 may communicate with database 22 using any suitable communication protocol such as a Fibre Channel or InfiniBand communication protocols of suitable speed. System 50 provides for the storage and retrieval of data based on multiple communication protocols.

FIG. 2 is a block diagram illustrating one example of a system 50 for processing data packets. System 50 processes data packets received from communications network 14, which may be based on any of a number of communication protocols, for storage in databases 22. System 50 may comprise logic encoded in any suitable media such as hardware, firmware, or software or any combination of the preceding. System 50 includes one or more interface converter paddles 70, a line card board 54, a backplane 56, and one or more switch cards 58.

Interface converter paddles 70 receive data packets from one of more physical links 60. Physical links 60 may comprise, for example, optical fiber cables or other fibers suitable for communicating data packets such as fibers operable to communicate electrical signals, for example, copper fibers. Interface converter paddle 70 may convert optical data signals into electrical data signals, if appropriate. Interface converter paddle 70 is configured to process data signals within a range of speeds associated with a specific communication protocol, for example, InfiniBand, Ethernet, or Fibre Channel communication protocols or suitable speed, and processes data packets according to the communication protocol. Interface converter paddle 70 may include a physical identifier such as a pin configuration that is used to identify the communication protocol.

TABLE 1 illustrates example communication protocols.

TABLE 1

| Communication Protocol | Line rate (Gbps) |
| --- | --- |
| 1G FC | 1.0625 |
| 2G FC | 2.125 |
| 1G FC/2G FC | 1.0625/2.125 |
| 10G FC | 4 × 3.1875 = 12.75 |
| 1 GE | 1.25 |
| 10 GE | 4 × 3.125 = 12.50 |
| 1x IB | 2.50 |
| 4x IB | 4 × 2.50 = 10.00 |

Line card board 54 includes paddle slots 62 that receive interface converter paddles 70. An interface converter paddle 70 is inserted into paddle slot 62 and coupled to a physical layer card 72. Physical layer card 72 transforms serial data signals into parallel data signals, and transmits the data signals to line card section 64. Physical layer card 72 identifies the communication protocol associated with interface converter paddle 70 and transforms the data signals according to the identified communication protocol. According to one embodiment, different interface converter paddles 70 associated with different communication protocols may be coupled to physical layer card 72, allowing for physical layer card 72 to receive data signals based on different communication protocols.

Line card section 64 directs physical layer card 72 to process data packets according to the communication protocol. Backplane 56 couples line card board 54 to switch cards 58. Switch cards 58 communicate the data packets to databases 22.

Figure 3:
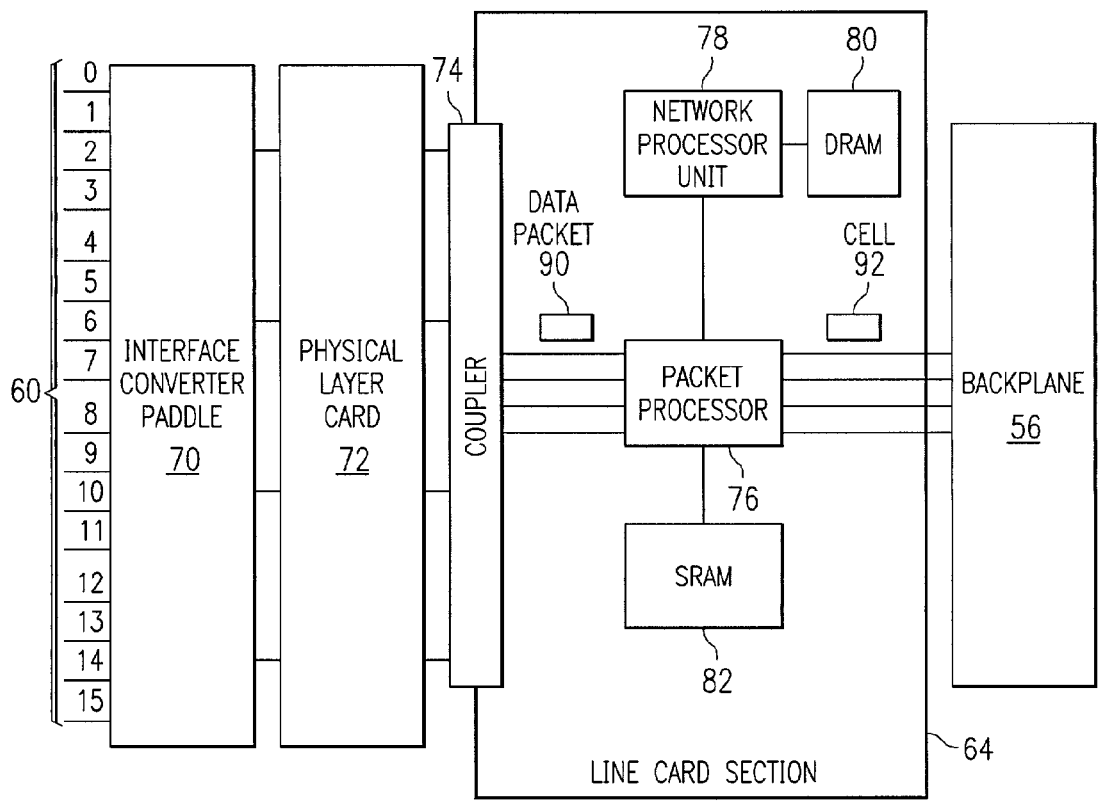
FIG. 3 is a block diagram illustrating examples of an interface converter paddle and a line card section of FIG. 2.

FIG. 3 is a block diagram illustrating examples of interface converter paddle 70, physical layer card 72, and line card section 64 of FIG. 2. Interface converter paddle 70 is coupled to physical links 60, and may perform optical-to-electrical and electrical-to-optical conversions, if appropriate. Interface converter paddle 70 may comprise, for example, gigabit interface converters (GBIC) having any suitable port such as an InfiniBand, Ethernet, or Fibre Channel port, that supports any suitable speed. In the illustrated example, physical layer card 72 performs physical layer conversations on data packets (such as data packet 90) or cells (such as cell 92), for example, clock recovery, framing, 10b/8b decoding, and deserialization. Interface converter paddle 70 and physical layer card 72 may accommodate any suitable number of links 60. In the illustrated example, physical links 60 are labeled link 0 though link 15.

Coupler 74 couples physical layer card 72 to line card section 64. Packet processor 76 performs data link switching such as Layer 2 switching of the OSI model and network routing such as Layer 3 routing of the OSI model according to the appropriate communication protocol. Packet processor 76 is described in more detail with reference to FIG. 4.

Network processor unit (NPU) 78 performs data packet processing such as Layer 4 through Layer 7 processing of the OSI model on data packets received from packet processor 76. For example, network processor unit 78 may perform protocol conversion, server bypassing, and/or transmission control protocol (TCP) connection and termination. Network processor unit 78 may also handle management and control packets. Network processor unit 78 may use a dynamic random access memory (DRAM) 80 to perform packet processing such as protocol conversion or server bypassing. Packet processor 76 may use a static random access memory (SRAM) 82 to perform dynamic packet buffering.

Packet Processor

Figure 4:
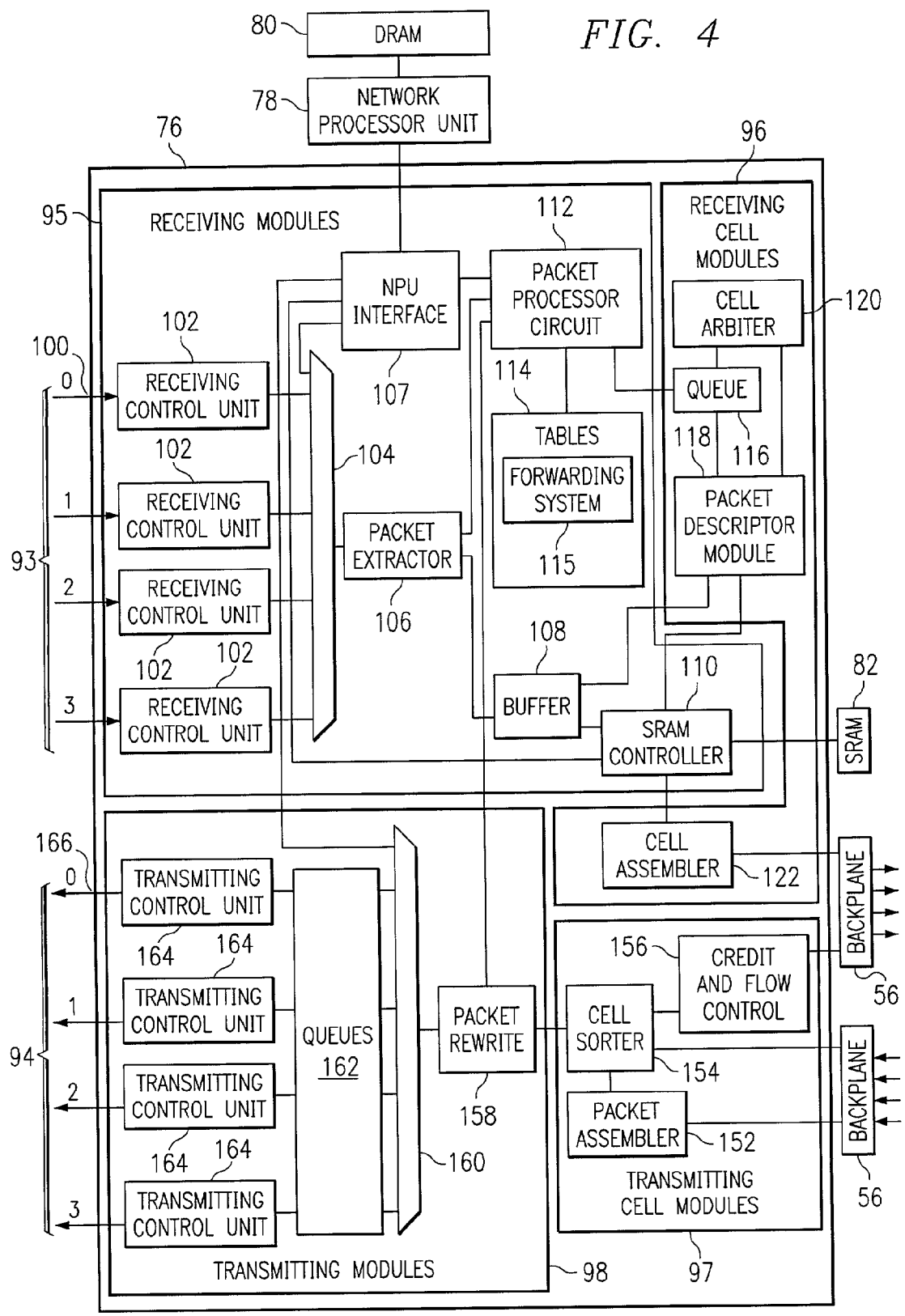
FIG. 4 is a block diagram illustrating one example of a packet processor.

FIG. 4 is a block diagram illustrating one example of packet processor 76 of FIG. 3. Packet processor 76 identifies the communication protocol of interface converter card 70 to which packet processor 76 is coupled, and processes data packets according to the identified communication protocol. Packet processor 76 includes a receiving portion 93 that receives data packets from interface converter card 70 and transmits the data packets to switch cards 58, and a transmitting portion 94 that receives data packets from switch cards 58 and transmits the data packets through interface converter paddle 70.

Receiving portion 93 includes ingress ports 100 that receive data packets through interface converter paddle 70. In the illustrated example, ingress ports 100 are labeled port 0 through port 3. Ingress port 100 operates at a data rate suitable for the communication protocol, for example, 0.85 Gbps for 1G Fibre Channel, 1.7 Gbps for 2G Fibre Channel, 1 Gbps for 1G Ethernet, 10 Gbps for 10G Ethernet, 2 Gbps for 1× InfiniBand, or 8 Gbps for 4× InfiniBand.

Receiving control units 102 perform media access control operations. Receiving control unit 102 identifies the communication protocol associated with interface converter paddle 70 and configures itself to communicate data packets between interface converter paddle 70 and packet processor 76 according to the communication protocol. Data packets based on any of a number of communication protocols may be converted to a generic format. Receiving control unit 102 may be responsible for implementing, for example, link initialization, clock recovery, and lane deskew for multi-lane links. Receiving control unit 102 is described in more detail with reference to FIG. 7.

A multiplexer 104 selects data packets from receiving control units 102 or an NPU interface 107 and passes them to a packet extractor 106. Packet extractor 106 performs decoding and processing according to the communication protocol. For example, packet extractor 106 may identify the header of a data packet, merge byte streams, and drop padding or unused byte streams. Packet extractor 106 may also check for errors, drop data packets with errors, and record the errors. Packet extractor 106 stores data packets and data packet information in buffer 108, and SRAM controller 110 schedules slots for buffer 108. Data packet information may include, for example, a data packet head-of-chain pointer. Network processor unit (NPU) interface 107 transmits data packets to network processor unit 78.

Packet processor circuit 112 processes data packets received from packet extractor 106 to route data packets according to the communication protocol. For example, packet processor circuit 112 may perform switching and multicasting for Ethernet, InfiniBand, or Fibre Channel data packets, and may perform routing for Ethernet or InfiniBand data packets. Packet processor circuit 112 may access tables 114 to process the data packets. Table 114 may include a forwarding system 115 that associates destination addresses with port identifiers. Packet processor circuit 112 may store data packets and data packet information in queue 116. Packet information may include, for example, a destination port identifier, source port identifier, data packet length, or data packet age.

Receiving cell modules 96 convert data packets to cells. Packet descriptor module 118 receives data packet information from queue 116 and buffer 108. A cell arbiter 120 segments a data packet into cells for delivery to backplane 56. A cell assembler 122 prepares and sends the cells to backplane 56, which transmits the cells to switch cards 58.

Transmitting portion 94 receives cells from switch cards 58 through backplane 56. Transmitting cell modules 97 convert cells to data packets. A packet assembler 152 receives cell payload, and a cell sorter 154 receives cell headers. Cell sorter 154 sorts cell payload into data packets according to the cell headers. A credit and flow control module 156 processes flow control credit cells received from cell sorter 154. A packet rewrite module 158 receives assembled packets from cell sorter 154. Packet rewrite module 158 sends data packets that include rewrite indications to packet processor circuit 112 for a packet rewrite.

A demultiplexer 160 receives data packets from packet rewrite 158 and sends the data packets to network processor unit 78 for further processing or to queues 162 for transmission to interface converter paddles 70. Queues 162 send data packets to transmitting control units 164. Transmitting control units 164 perform media access control operations, and convert the data from a general format to a format specific to the communication protocol associated with interface converter paddle 60. Transmitting control units 164 are described in more detail with reference to FIG. 11. Transmitting control units 164 send the data packets to interface converter paddle 70 via to egress ports 166. Egress ports 166 correspond to ingress ports 100. In the illustrated example, egress ports 166 labeled port 0 through port 3 correspond to ingress ports 100 labeled port 0 through port 3, respectively.

FIG. 5 is a flowchart illustrating one example of a method for processing a data packet. The method allows for data packets based on any of a number of communication protocols to be stored in databases 22. The method begins at step 170, where interface converter paddle 70 is received at paddle slot 62. The communication protocol of interface converter paddle 70 is identified at step 172. The communication protocol may be identified by detecting a physical identifier such as a pin configuration of interface converter paddle 70. At step 174, line card section 64 is configured according to the communication protocol. Line card section 64 is configured to process data packets based on the communication protocol. An example of configuring line card section 64 is described in more detail with reference of FIG. 8.

At step 176, data packets from interface converter paddle 70 are received at line card section 64. The data packets are processed according to the communication protocol at step 178. Processing data packets is described in more detail with reference to FIG. 4. Data packets are converted to cells at step 179. The cells are transmitted to switch card 58 at step 180.

Cells from switch cards 58 are received at line card section 64 at step 182. The cells are converted to data packets at step 183. At step At step 184, the data packets are processed according to the communication protocol. The processing of the data packets is described in more detail with reference to FIG. 4. AT step 186, data packets are transmitted to interface converter paddle 70. After transmitting the data packets, the method terminates.

Receiving And Transmitting Control Units

FIG. 6 is a block diagram illustrating one example of receiving control unit 102 of FIG. 4. Receiving control unit 102 provides an interface between physical layer card 72 and packet processor 76. Receiving control unit 102 identifies a communication protocol associated with interface converter paddle 70 and processes packets according to the communication protocol.

Receiving control unit 102 includes a receive 200, a receive block 202, and a receive interface 204, which are described in more detail with reference to FIGS. 7 through 9. Data packets and control signals from interface converter paddle 70 travel through receive link 200, receive block 202, and receive interface 204, and to packet processor 76. Receiving control unit 102 may handle data packets from any suitable number of physical links 60, and any suitable number of receiving control units 102 may be coupled to interface converter paddle 70.

Receiving control unit 102 establishes a communication link for data communication by synchronizing and conditioning the communication link according to the communication protocol associated with interface converter paddle 70. Receiving control unit 102 may communicate with transmitting control unit 164 to establish the communication link. Receiving control unit 102 performs data packet reception operations, for example, decoding data packets and/or checking data packet validity. Receiving control unit 102 may check data packet validity by, for example, performing cyclic redundancy check (CRC) validation or other validation operation.

Receiving control unit 102 also performs flow control operations. Receiving control unit 102 may examine a received data packet stream for flow control information. The flow control information may be used to determine whether transmitter control unit 164 may transmit scheduled data packets. Receiving control unit 102 may also generate flow control information that is transmitted by packet processor 76.

Figure 7:
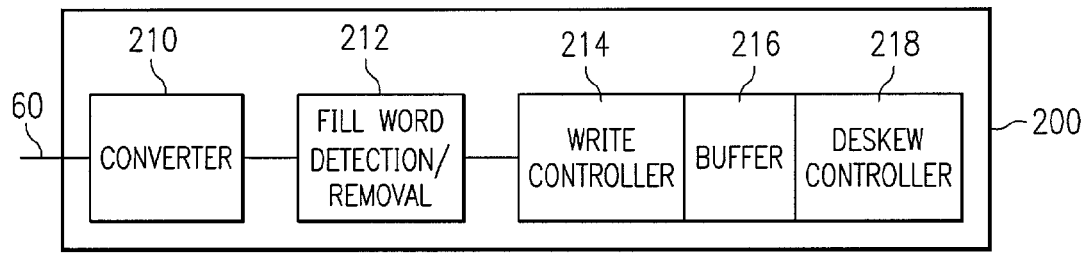
FIG. 7 is a block diagram illustrating one example of a receive link of FIG. 6.

FIG. 7 is a block diagram illustrating one example of a receive link 200 of FIG. 6. Receive link 200 may be associated with any suitable number of physical links 60. Interface converter paddle 70 may use any suitable configuration of lanes and links 200 to support a communication protocol. A physical link 60 may comprise multiple lanes. A lane refers to a single data path. Lanes may be routed through corresponding ingress ports 100 and egress ports 166.

TABLE 2

| Communication protocol Type | A | B | C | D |
|---|---|---|---|---|
| Lane 0 | Port 0 | Port 0 | Port 0 | Port 0 |
| 1 | | 0 | 0 | 1 |
| 2 | | 0 | 0 | 2 |
| 3 | | 0 | 0 | 3 |
| 4 | 1 | 1 | 0 | 4 |
| 5 | | 1 | 0 | 5 |
| 6 | | 1 | 0 | 6 |
| 7 | | 1 | 0 | 7 |
| 8 | 2 | 2 | 0 | 8 |
| 9 | | 2 | 0 | 9 |
| 10 | | 2 | 0 | 10 |
| 11 | | 2 | 0 | 11 |
| 12 | 3 | 3 | 3 | 12 |
| 13 | | 3 | 3 | 13 |
| 14 | | 3 | 3 | 14 |
| 15 | | 3 | 3 | 15 |

TABLE 2 illustrates examples of configurations of lanes and ports 100 and 166 according to a type of communication protocol. The lane numbers are illustrated in FIG. 3, and the port numbers are illustrated in FIG. 4. According to TABLE 2, interface converter paddle 70 supporting a communication protocol of type A, such as a 1× InfiniBand, 1G or 2G Fibre Channel, or 1G Ethernet communication protocol may use receive links 200 associated with lanes 0, 4, 8, and 12 routed through ports 0, 1, 2, and 3, respectively. Interface converter paddle 70 that supports a type B communication protocol such as a 4× InfiniBand, 10G Ethernet, or 10G Fibre Channel communication protocol may use receive links 200 associated with lanes 0 through 16 divided into four ports, for example, lanes 0 through 3 routed through port 0, lanes 4 through 7 routed through port 1, etc. Interface converter paddle 70 that supports a type C communication protocol such as a 12× InfiniBand communication protocol may use receive links 200 associated with lanes 0 through 16 divided into two ports, for example, lanes 0 through 11 routed through port 0, and lanes 12 through 15 are routed through port 3. Interface converter paddle 70 that supports a type D communication protocol may use receive links 200 associated with lanes 0 through 16 routed through ports 0 through 16, for example, lane 0 routed through port 0, lane 1 routed through port 1, etc.

Receive link 200 may include a converter 210, a fill word detection/removal module 212, a write controller 214, a buffer 216, and a deskew controller 218. Converter 210 supports double data rate operation by assembling double data rate characters into two character-wide single data rate words. Fill word detection/removal module 212 identifies characters such as fill words that may be dropped for clock recovery/tolerance purposes. Fill word detection/removal module 212 notifies write controller 214 of the alignment and position of the characters that may be dropped from the received data stream. Write controller 214 determines the amount of data stored in buffer 216, and adjusts the amount of data written to buffer 216 in response to the amount of data stored in buffer 216. For example, if write controller 214 determines that buffer 216 includes more than a predetermined amount of data, write controller 214 may reorder or drop characters. Buffer 216 may comprise, for example, a first in-first out (FIFO) buffer.

Deskew controller 218 manages the skew between multiple lanes routed to a single port. Skew describes the difference in the travel times of data packets traveling along different lanes. Lanes may be skewed by several clock cycles. Deskew controller 218 determines whether lanes are skewed and aligns, or deskews, lanes according to the appropriate protocol. Whether deskewing is required may depend on the protocol of interface converter paddle 70. For example, data packets from a interface converter paddle 70 configured for 4× or 12× InfiniBand, 10 GE Ethernet, or 10G Fibre Channel may require deskewing.

Figure 8:
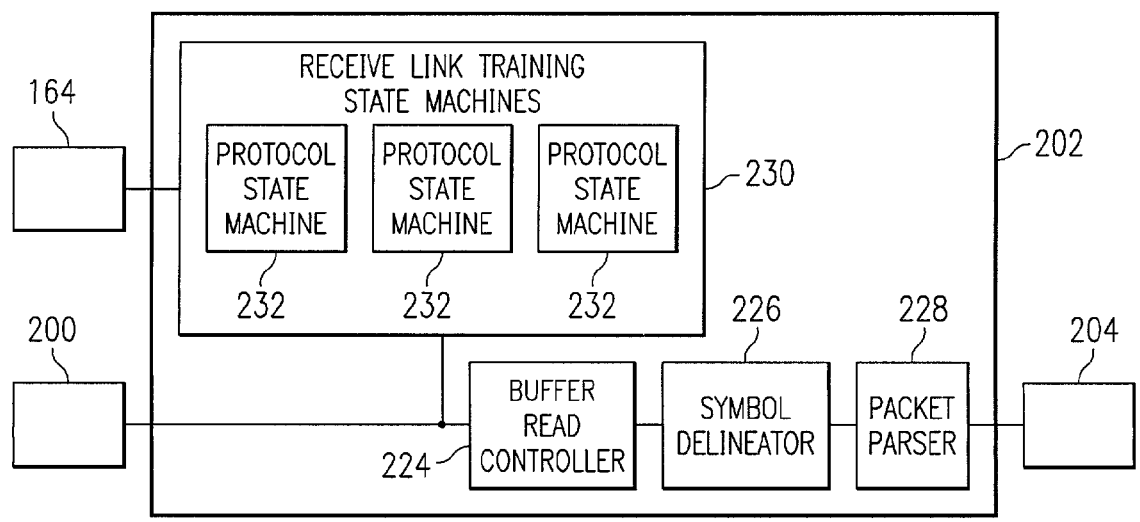
FIG. 8 is a block diagram illustrating one example of a receive block of FIG. 6.

FIG. 8 is a block diagram illustrating one example of receive block 202 of FIG. 6. Receive block 202 checks for link level and data packet errors and forwards data packets and status information to receive interface 204. Receive block 202 may include a buffer read controller 224, a symbol delineator 226, a packet parser 228, and receive link training state machines 230. Buffer read controller 224 receives multiple lanes of data and generates a data packet stream from the received data. Symbol delineator 226 detects a start and an end of packet delimiter and checks for link level errors. Packet parser 228 checks for data packet errors, and may, for example, check a CRC sequence associated with a data packet. Packet parser 228 may access a buffer that includes instructions for checking data packets according to multiple communication protocols. Packet parser 228 may be configured to use the instructions for the communication protocol associated with interface converter paddle 70.

Receive link training state machines 230 implements link synchronization operations. Receive link training state machines 230 include protocol state machines 232 that each implement link training operations for a specific communication protocol. Protocol state machine 232 for the communication protocol of interface converter paddle 70 sends link synchronization instructions to a buffer of transmitting control unit 164. A transmit link training state machine of transmitting control unit 164 processes the instructions in order to establish the communication link.

Figure 9:
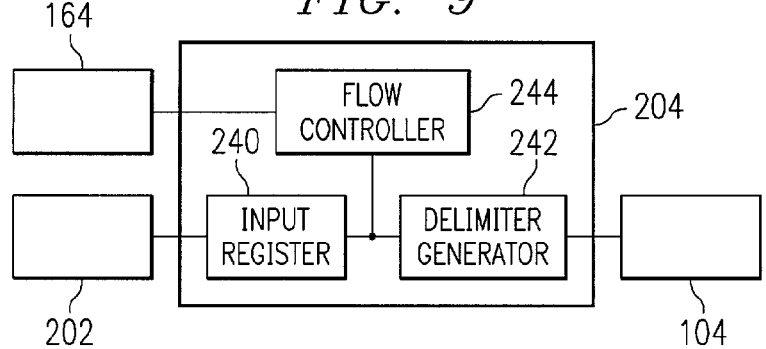
FIG. 9 is a block diagram illustrating one example of a receive interface of FIG. 6.

FIG. 9 is a block diagram illustrating one example of receive interface 204 of FIG. 6. Receive interface 204 controls the flow of data packets. Receive interface 204 may include an input register 240, a delimiter generator 242, and a flow controller 244. Input register 240 receives data packets from receive blocks 202. Delimiter generator 242 provides control signals to packet processor 76 based on status and error indications received from receive block 202. Flow controller 244 detects flow control packets and parses relevant flow control information from the flow control packets. Flow controller 244 communicates with transmitting control unit 164 to adjust transmission of data packets to interface converter paddle 70 in response to the flow control information.

Figure 10:
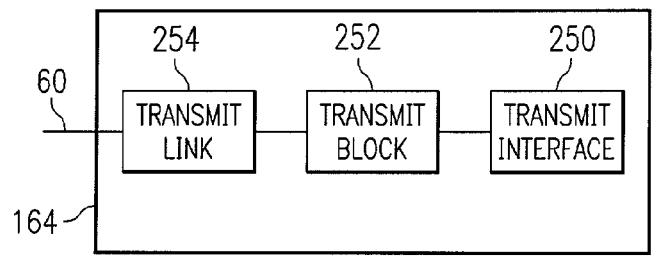
FIG. 10 is a block diagram illustrating one example of a transmitting control unit.

FIG. 10 is a block diagram illustrating one example of transmitting control unit 164 of FIG. 4. Transmitting control unit 164 provides an interface between packet processor 76 and physical layer card 72. Transmitting control unit 164 may be configured to support a communication protocol associated with interface converter paddle 70.

Transmitting control unit 164 may include a transmit interface 250, a transmit block 252, and a transmit link 254. Transmit interface 250 and transmit block 252 are described in more detail with reference to FIGS. 11 and 12. A packet from packet processor 76 is communicated through transmit interface 250, transmit block 252, and transmit link 254, and then to interface converter paddle 70.

Transmitting control unit 164 performs data packet transmission operations. Transmit interface 250 receives generic data packets and extracts data packet information from received generic data packets. Transmit interface 250 provides the data packet information and data packets to transmit block 252. Transmit block 252 examines the state of the communication link and determines whether to drop or transmit a data packet. If a data packet is to be transmitted, transmit block 252 appends packet delineation symbols and communicates the data packet to transmit link 254. Transmit link 254 encodes the data packet according to the communication protocol.

Transmitting control unit 164 also communicates with receiving control unit 102 to establish a communication link for data packet transmission. Transmitting control unit 164 also provides flow control operations and informs interface converter paddle 70 when to initiate data packet transmission.

Figure 11:
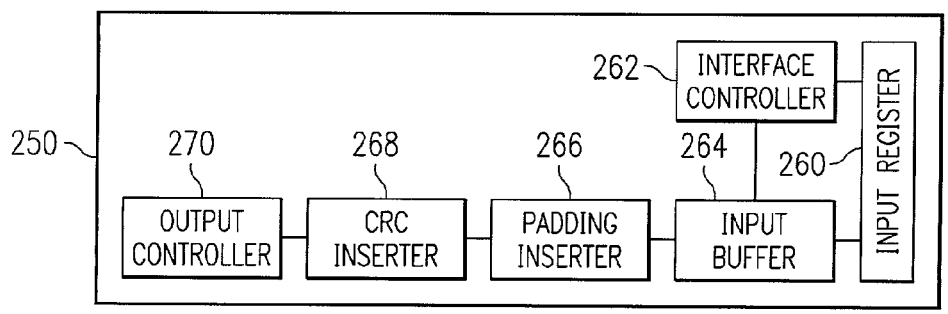
FIG. 11 is a block diagram illustrating one example of a transmit interface of FIG. 10.

FIG. 11 is a block diagram illustrating one example of transmit interface 250 of FIG. 10. Transmit interface 250 includes an input register 260, an interface controller 262, an input buffer 264, a padding inserter 266, a CRC inserter 268, and an output controller 270. Input register 260 receives data packets from queues 162. Interface controller 262 manages the flow of data packets into input buffer 264. Input controller 262 may control the flow of data packets such that the input buffer 264 is maximized in order to optimize efficiency. Padding inserter 266 inserts padding or cell bytes into the data packet stream, and CRC inserter 268 inserts CRC sequences into the data packet stream. For example, CRC inserter 268 may insert an InfiniBand CRC according to an InfiniBand protocol of suitable speed. Output controller 270 controls the flow of data packets to interface converter paddle 70.

Figure 12:
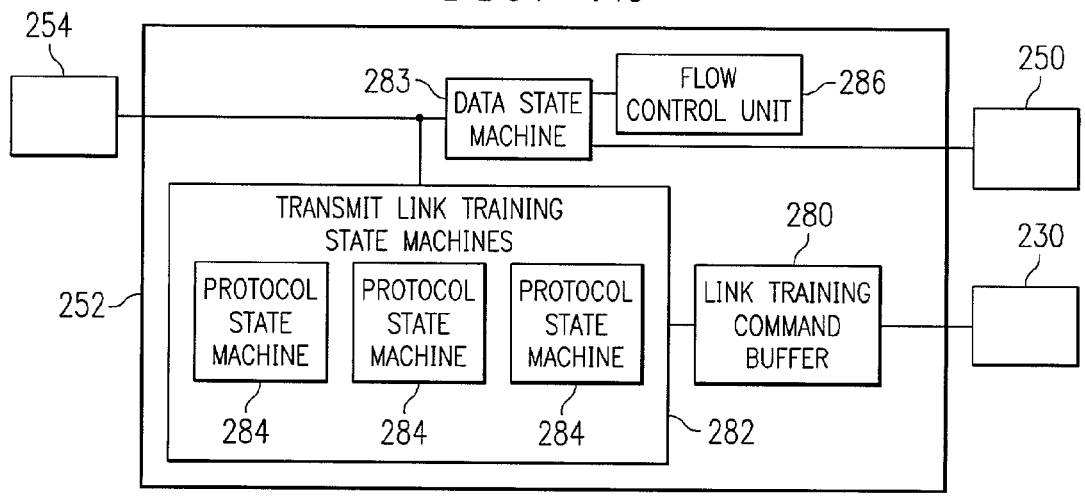
FIG. 12 is a block diagram illustrating one example of a transmit block of FIG. 10.

FIG. 12 is a block diagram illustrating one example of transmit block 252 of FIG. 10. Transmit block 252 includes a link training command buffer 280, transmit link training state machines 282, a data state machine 283, and a flow control unit 286. Transmit link training state machine 282 include protocol state machines 284 that establish link synchronization according to the communication protocol of interface converter paddle 70. A protocol state machine 284 receives instructions sent from receiving control unit 102 through link training command buffer 280. Data state machine 283 maintains the data packet stream after the communication link is established by inserting packet information or idle data into the data packet stream. If a data packet is to be transmitted, data state machine 283 checks the state of the communication link. If the communication link is operable to accept data packets, the data packet is transmitted. Otherwise, the data packet is dropped. Flow control unit 286 sends requests to data state machine 283 to send flow control information.

Figure 13:
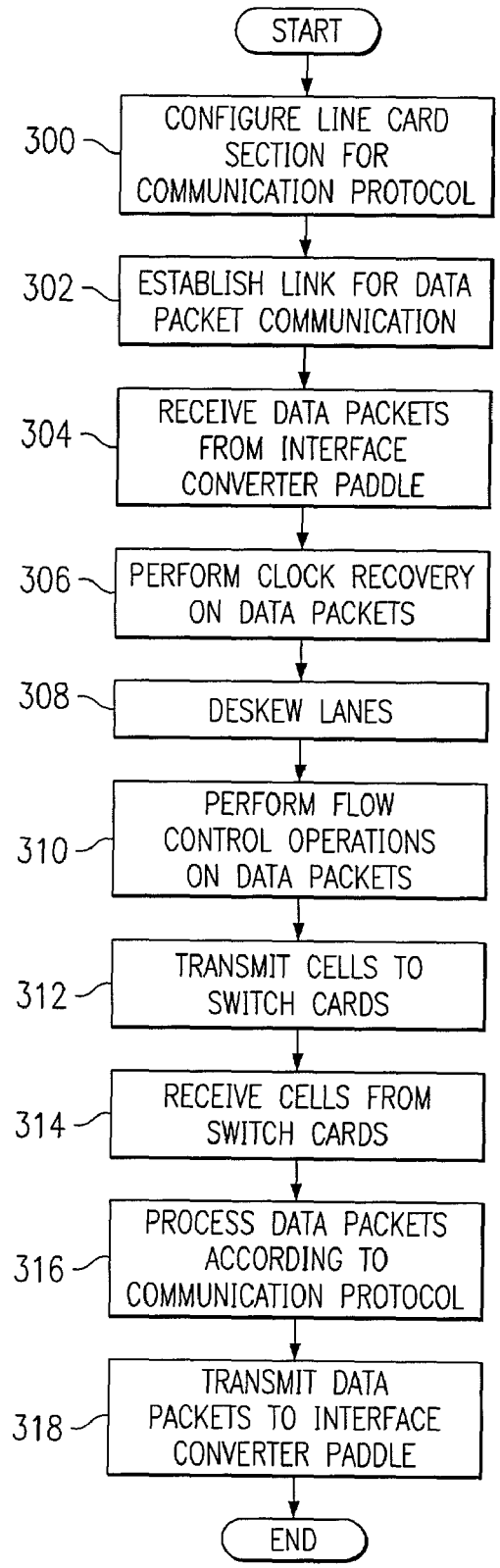
FIG. 13 is a flowchart illustrating one example of a method for communicating data packets according to a communication protocol.

FIG. 13 is a flowchart illustrating one example of a method for communicating data packets according to a communication protocol. The method communicates data packets from interface converter paddle 70 to packet processor 76 and vice-versa according to a communication protocol associated with interface converter paddle 70.

The method begins at step 300, where line card section 64 is configured for the communication protocol associated with interface converter paddle 70. Receiving control unit 102 may configure line card section 64 by associating lanes with ports 100 and 166. A communication link for data packet communication is established at step 302. Receiving control unit 102 and transmitting control unit 164 may communicate with each other to establish the communication link. At step 304, data packets are received from interface converter paddle 70.

Clock recovery is performed on the data packets at step 306. Receive link 200 may be used to perform the clock recovery. Lanes that are skewed are deskewed at step 308. Deskew controller 218 of receive link 200 may adjust the flow of bytes of the data packets such that the bytes travelling on different lanes are synchronized.

Flow control operations are performed on the data packets at step 310. Flow controller 244 of receive interface 204 receives flow control information and may adjust the flow of data packets in response to the flow control information. Flow controller 244 may also instruct transmitting control unit 164 to adjust the flow of data packets to be transmitted to interface converter paddle 70. The data packets are converted to cells, which are transmitted to switch card 58 at step 312.

At step 314, data packets are received from switch cards and converted to cells. The data packets are processed according to the communication protocol at step 316. Transmitting control unit 164 may be used to process the data packets. Data packets are transmitted to interface converter paddle 70 at step 318. After transmitting the data packets to switch cards 58, the method is terminated.

Interface Converter Paddle and Physical Layer Card

Figure 14:
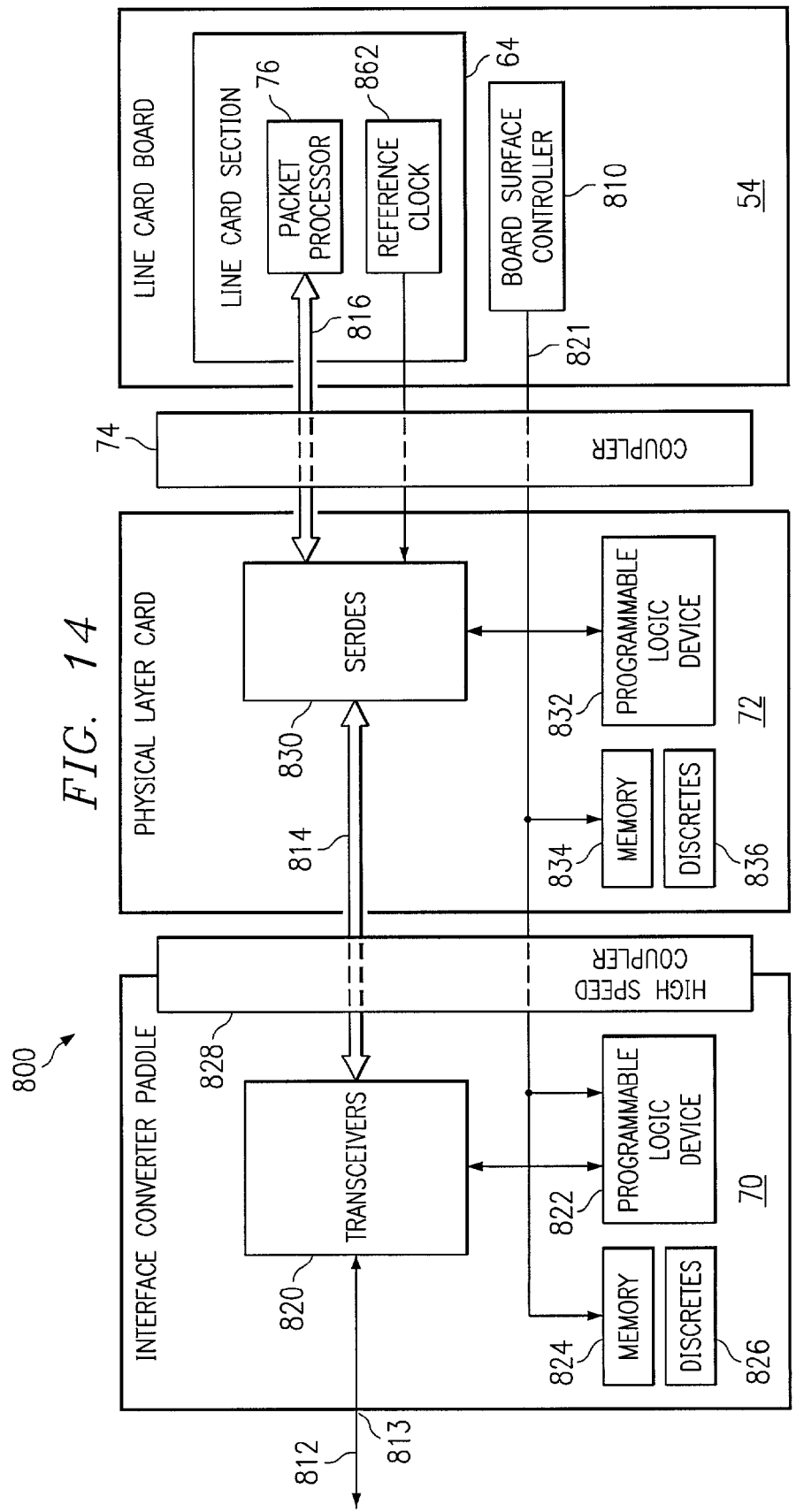
FIG. 14 is a block diagram of an example of a system for converting data signals.

FIG. 14 is a block diagram of an example of a system 800 for converting data signals. System 800 includes interface converter paddle 70, physical layer card 72, and line card 54. According to one embodiment, interface converter paddle 70 receives serial optical data signals 812 and converts data signals 812 into serial electrical data signals 814. According to another embodiment, interface converter paddle 70 receives electrical data signals that do not require conversion. Interface converter paddle 70 may be configured to process data signals within a range of speeds associated with a specific communication protocol. Physical layer card 72 transforms serial electrical data signals 814 into parallel data signals 816, and transmits data signals 816 to line card 54. Physical layer card 72 identifies the communication protocol associated with interface converter paddle 70 and transforms the data signals in accordance with the identified communication protocol. According to one embodiment, different interface converter paddles 70 associated with different communication protocols may be coupled to physical layer card 72, allowing for physical layer card 72 to receive data signals based on different communication protocols.

Interface converter paddle 70 includes one or more transceivers 820, a programmable logic device 822, a memory 824, and discretes 826. A transceiver 820 receives optical data signal 812 through a port 813, transforms the optical data signals 812, which may comprise high-speed optical signals, into electrical data signals 814. According to one embodiment, transceiver 820 receives electrical data signals that do not require conversion. Transceivers 820 may be selected to handle speeds appropriate to the communication protocol of interface converter paddle 70. For example, a transceiver 820 may be selected to handle one Gigabit Ethernet. A transceiver 820 may handle multiple speeds, which may be controlled by software commands. Programmable logic device 822 controls the operations of transceivers 820, and may comprise, for example, a complex programmable logic device (CPLD). Programmable logic device 822 communicates with a board surface controller 810 and executes commands received from board surface controller 810. Programmable logic device 822 may also determine the status of each port 813 of interface converter paddle 70.

Memory 824 may comprise, for example, an erasable, programmable read-only memory (EPROM). Memory 824 may store, for example, an interface converter identifier such as a serial number, hardware revision information, and an interface converter type that describes the communication protocol and speed associated with interface converter paddle 70. Discretes 826 may include components for programmable logic device 822 and transceivers 820, for example, noise filtering components. High-speed coupler 828 may comprise, for example, a very high-density metric (VHDM) connector or other suitable connector. High speed coupler 828 may provide for hot-pluggability of interface converter paddle 70 such that interface converter paddle 70 may be removed or inserted without bringing down line card board 54 and/or system 800. High-speed coupler 828 may have physical identifiers such as pins that identify interface converter paddle 70 as associated with a specific communication protocol. High-speed couplers 828 of interface converter paddles 70 associated with different communication protocols may be substantially similar in order to allow different interface converter paddles 70 to be coupled to a same physical layer card 72.

Physical layer card 72 provides an interface between high-speed serial data signals 814 from interface converter paddle 70 and parallel data signals 816 from packet processor 76. Physical layer card 72 includes a serdes 830, a programmable logic device 832, a memory 834, and discretes 836. Serdes 830 serializes, deserializes, and adjusts the clock speed of data signals. Serdes 830 converts high-speed serial data signals 814 received through input 831 to parallel data signals 816 using, for example, a data line for transmitting and receiving data signals for each port.

Serdes 830 changes the clock speed of data signals 814 received from interface converter paddle 70, which may vary among different interface converter paddles 70, to a generic speed appropriate for packet processor 76. Conversely, serdes 830 changes the generic speed of data signals 816 received from packet processor 76 to a speed appropriate for interface converter paddle 70. Serdes 830 may be selected to handle any of a number of different speeds appropriate for different communication protocols. Accordingly, a physical layer card 72 may be used with multiple interface converter paddles 70. Serdes 830 may include pins that support parallel and serial data, a reference clock, and control functions. Programmable logic device 832 drives the control pins of serdes 830.

Programmable logic device 832 communicates with board surface controller 810 and executes commands received from board surface controller 810. Programmable logic device 832 may comprise, for example, a complex programmable logic device (CPLD). Programmable logic device 832 determines the communication protocol of interface converter paddle 70 according to an identifier such as a physical identifier, and informs board surface controller 810 of the identified communication protocol. Board surface controller 810 in turn notifies serdes 830 of the communication protocol. Board surface controller 810 determines the appropriate clock speed for the identified communication protocol and instructs programmable logic device 832 to set the clock frequency of serdes 830.

Programmable logic device 832 may be programmed to perform any suitable operation. For example, programmable logic device 832 may be programmed to be activated after receiving a data signal 814 of an appropriate voltage range from interface converter paddle 70. Programmable logic device 832 may also be programmed to monitor and/or communicate with transceiver 820.

Memory 834 may comprise, for example, an erasable, programmable read-only memory. Memory 834 may store, for example, a physical layer card identifier, hardware revision information, artwork revision information, and paddle type information. Discretes 836 may comprise, for example, resistors, capacitors, and filters.

Line card 54 includes packet processor 76, board surface controller 810, and a reference clock 862. Board surface controller 810 controls the operation of line card board 54. Board surface controller 810 may communicate with interface converter paddle 70 and physical layer card 72 using a data bus 821. Data bus 821 may operate at a frequency of 10 to 100 kHz and may support data, clock, and interrupt functions. An interrupt line may be used by interface converter paddle 70 and physical layer card 72 to notify board surface controller 810 of an urgent event. According to one embodiment, an interrupt line may be dedicated for each programming logic device 822 and 832. Reference clock 862 provides the reference timing for serdes 830.

Figure 15:
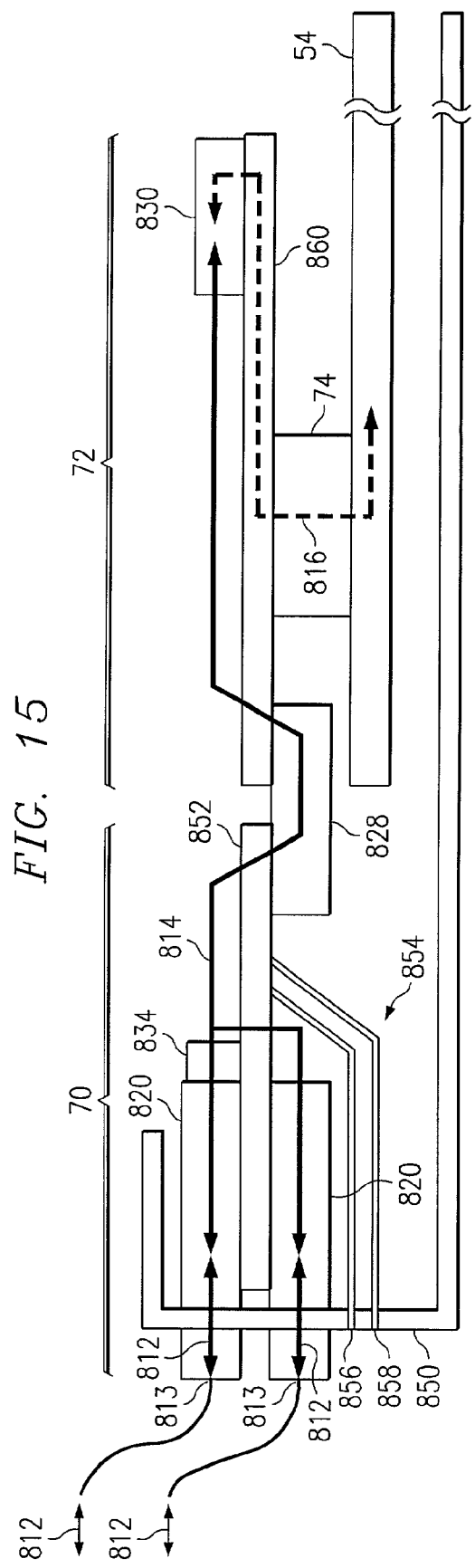
FIG. 15 is a side view of an example arrangement of an interface converter paddle, a physical layer card, and a line card board.

FIG. 15 illustrates a side view of an example arrangement of interface converter paddle 70, physical layer card 72, and line card board 54. Interface converter paddle 70 may be received by an input-side panel 850. Interface converter paddle 70 includes ports 813 and transceivers 820. Ports 813 may comprise, for example, optical fiber inputs that receive signals on different data pairs, using alternating current coupled current mode logic (CML). According to another embodiment, ports 813 may comprise a copper medium interface or other interface suitable for receiving electrical signals. The baud rates may range from 1.25 to 3.187 Gbps, depending upon the appropriate communication protocol. Transceivers 820 transform optical signals received from ports 813 into electrical signals, if appropriate. Transceivers 820 may be selected to handle speeds appropriate to the communication protocol of interface converter paddle 70. Transceivers 820 may include control pins that control the operation of transceivers 820. Programmable logic device 822 may drive the control pins in order to control transceivers 820.

A coupler 834 is coupled to transceivers 820. Coupler 834 may comprise, for example, a small-form factor pluggable (SFP) transceiver right angle surface mount (SMT) receptacle or other suitable connector. Transceivers 820 and coupler 834 are coupled to substrate 852. A statue indicator 554 indicates the status of interface converter paddle 70. Status indicator 854 may comprise, for example, light-emitting diodes (LEDs) and light pipes that channel the light from the light-emitting diodes to input-side panel 850. Board surface controller 810 determines that status and instructs programmable logic device 822 to indicate the appropriate status.

According to one example, there may be two status indicators 854 per port 813, an activity indicator 856 and a fault indicator 858. Status indicators 854 may indicate status by any suitable means, for example, by using color, blinking, turning a light on, or turning a light off. Activity indicator 856 may indicate whether there is a link, whether the link is configured, whether there is an error in the link, and whether there is activity or traffic. Packet processor 76 determines data traffic and informs board surface controller 810 of the traffic status. A fault indicator 856 may indicate whether the link is normal, whether there is a fault, whether there is a fabric fault, whether the link is beaconing.

A high-speed coupler 828 couples transceivers 820 to physical layer card 72. High-speed coupler 828 may comprise, for example, a very high-density metric (VHDM) right-angle connector. High speed coupler 828 may comprise an approximately two millimeter pitch connector with multiple signal pins such as six rows and ten columns of signal pins, as well as a power plug and keyed guide pin modules. According to one example, grounding plates may be placed between each column for isolation, and the pin lengths may be staggered so the order of contact is ground, power, and signals to allow for hot-pluggability. A coupler 74 couples physical layer card 72 to line card board 54. Coupler 74 may comprise, for example, a C-Byte board mezzanine connector by INTERCON SYSTEMS, INC. or other suitable connector.

Physical layer card 72 includes serdes 830 coupled to a substrate 860. Serdes 830 may comprise, for example, a MINDSPEED quad serdes transceiver by CONEXANT SYSTEMS, INC. Serdes 830 may include four transmitters and four receivers, each supporting a range of operation from one to 3.4 Gps. Serdes 830 may be compatible with ten Gigabyte Ethernet and ten Gigabyte Fibre Channel, and may be able to transmit and receive ten Gbps. According to one embodiment, serdes 830 may be displaced outwardly from line card 54 a distance of approximately 0.5 to one inch such as 0.675 inches. Serdes 830 may be proximate to transceivers 820, for example, a distance of approximately two to four inches such as three inches.

FIG. 16 is a flowchart illustrating an example of a method for converting data signals. The method begins at step 880, where interface converter paddle 70 is coupled with physical layer card 72. Interface converter paddle 70 may be coupled by receiving interface converter paddle 72 in input-side panel 850 to couple high-speed coupler 828 to physical layer card 72. A communication protocol assisted with interface converter paddle 70 is identified at step 882. Programmable logic device 832 determines the communication protocol of interface converter paddle 70 and notifies board-surface controller 810 of the identified communication protocol. Board surface controller 810 in turn notifies serdes 830 of the communication protocol. The clock frequency of serdes 830 is set according to the identified communication protocol at step 884. Board surface controller 810 determines the appropriate clock speed for the identified communication protocol and instructs programmable logic device 832 to set the clock frequency of serdes 830.

Data signals 812 are received by interface converter paddle 70 at step 886. Interface converter paddle 70 converts data signals 812 from optical data signals 812 to electrical data signals 814 at step 887, if appropriate. Physical layer card 72 converts data signals 814 from serial data signals 814 to parallel data signals 816 at step 888. Data signals 816 are transmitted to line card 54 at step 888. After transmitting the data signals 816, the method terminates.

FIG. 17 is a top view of a first exemplary embodiment of an interface converter paddle 890. Interface converter paddle 890 may support eight ports or, for example, one Gigabyte Fibre Channel, two Gigabyte Fibre Channel, one Gigabyte Ethernet, or 1× InfiniBand. Interface converter paddle 890 includes transceivers 820 with ports 813, programmable logic device 822, and coupler 828, coupled to substrate 852. Transceivers 820 may comprise eight small form factor pluggable transceivers, and may support differential data lines as fast as 2.4 Gbps. Transceivers 820 may include control pins for received loss of signal, transmit fault, transmit disable, rate select, and an interface to memory 824. The control pins may be coupled to programmable logic device 822 and may be controlled and monitored by board surface controller 810 via bus 821.

Figure 18:
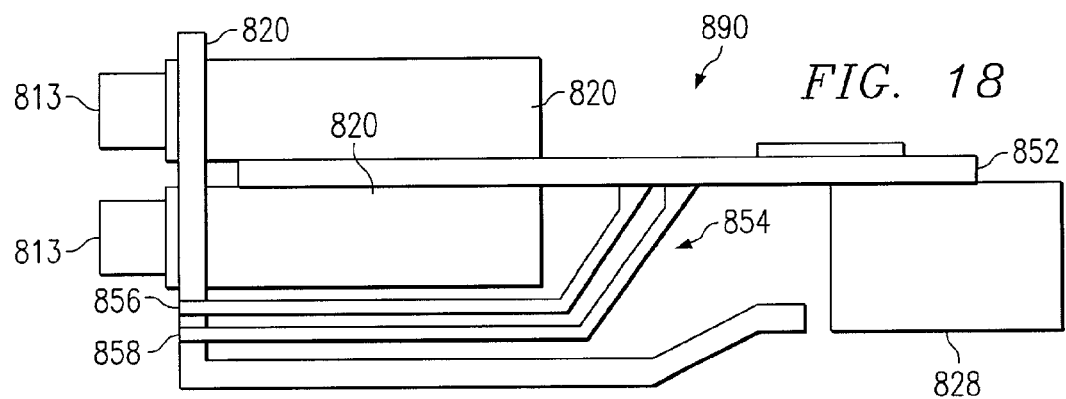
FIG. 18 is a side view of the interface converter paddle of FIG. 17.

FIG. 18 is a side view of interface converter paddle 890 of FIG. 17. Interface converter paddle 890 includes status indicators 854 that include activity indicator 856 and fault indicator 858.

Figure 19:
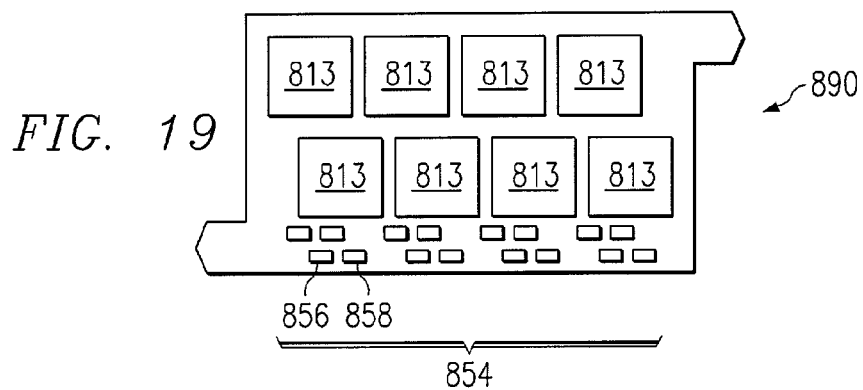
FIG. 19 is a input-side view of the interface converter paddle of FIG. 17.

FIG. 19 is an input-side view of interface converter paddle 890 of FIG. 17. Input side panel 850 includes ports 813, activity status indicator 856, and fault status indicator 858.

Figure 20:
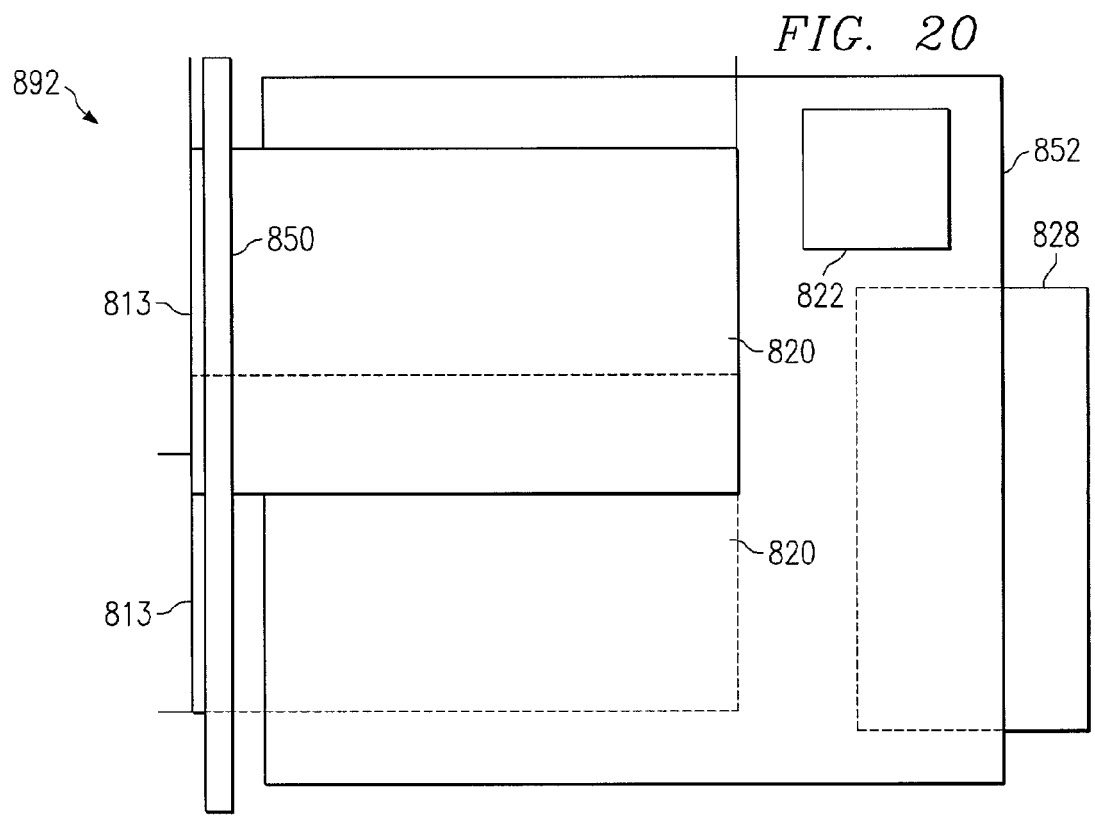
FIG. 20 is a top view of another example of an interface converter paddle.

FIG. 20 is a top view of a second exemplary embodiment of an interface converter paddle 892. Interface converter paddle 892 includes transceivers 820 with ports 813, programmable logic device 822, and coupler 828 coupled to substrate 852. Transceivers 820 may comprise two XGP Multisource Agreement (XGP MSA) compliant transceivers, and may support different data lines as fast as 3.1876 Gbps. Transceivers 820 may be arranged in a staggered manner on substrate 852. Transceiver 820 may include control pins that are accessed using a standard that is not supported by board surface controller 810, for example, a management data input/output (MDIO) standard, but is supported by programmable logic device 822. Alternatively, board surface controller 810 may be designed to support the standard. Interface converter 843 may support two ports of ten Gigabit Fibre Channel or ten Gigabit Ethernet.

Figure 21:
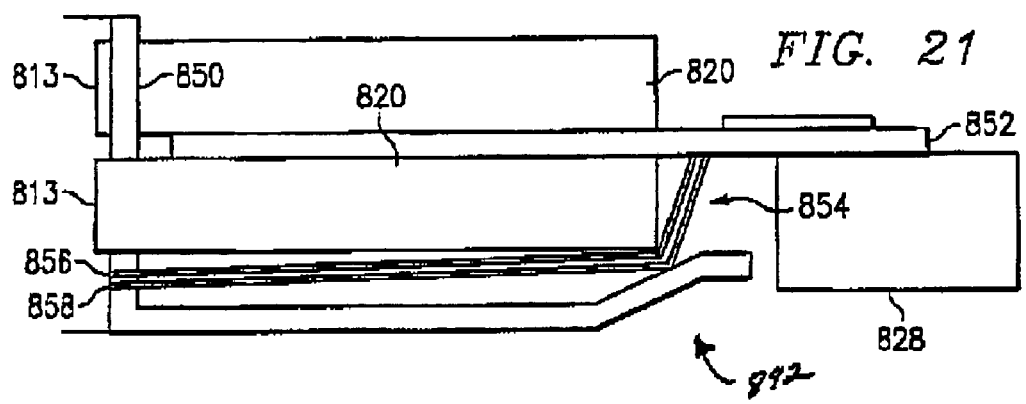
FIG. 21 is a side view of the interface converter paddle of FIG. 20.

FIG. 21 is a side view of interface converter paddle 892 of FIG. 20. Status indicators 854 include activity status indicators 856 and fault status indicators 858.

Figure 22:
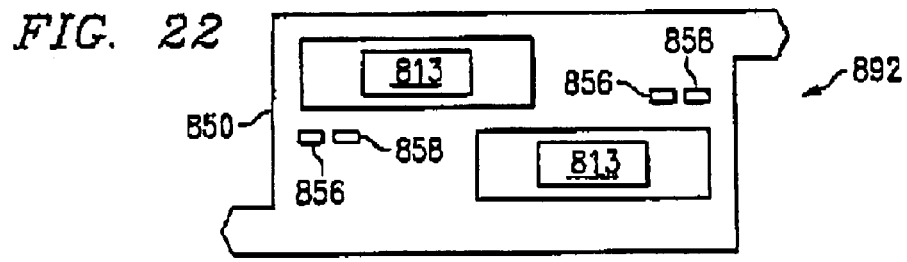
FIG. 22 is an input-side view of the interface converter paddle of FIG. 20.

FIG. 22 is an input-side view of interface converter paddle 892 of FIG. 20. Input-side panel 850 includes ports 813, activity indicators 856 and fault indicators 858.

Figure 23:
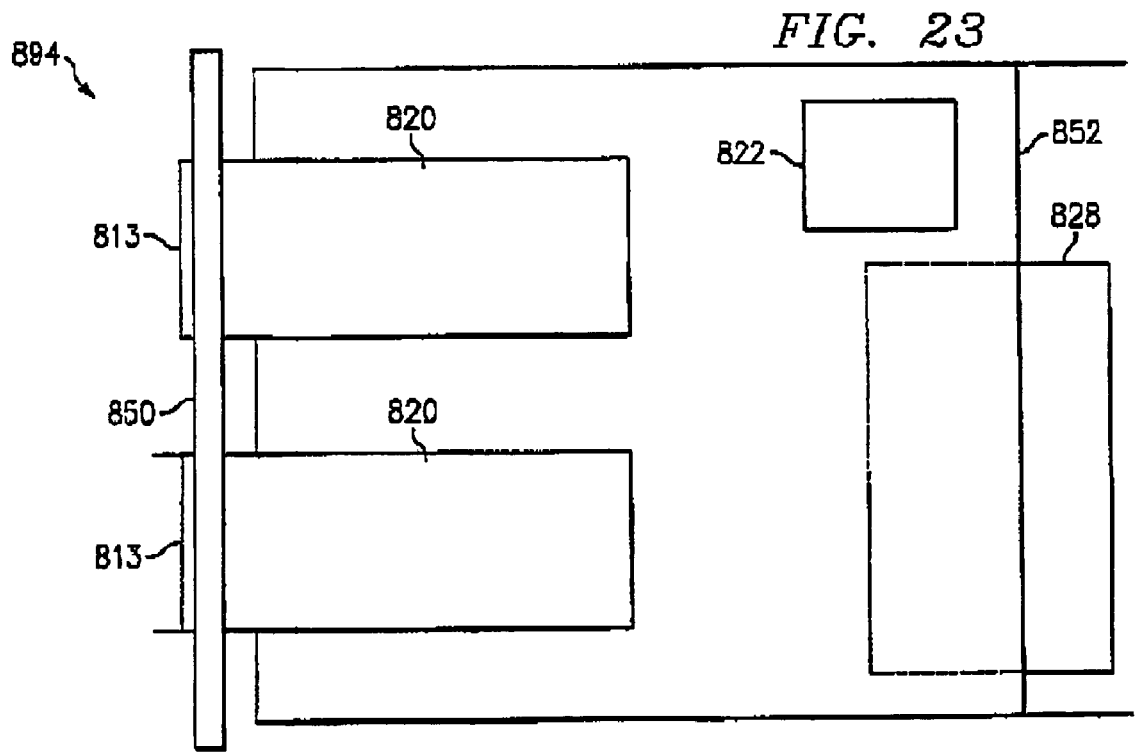
FIG. 23 is a top view of another example of an interface converter paddle.

FIG. 23 is a top view of a third exemplary embodiment of an interface converter paddle 894. Interface converter paddle 894 includes transceivers 820 with ports 813, programmable logic device 822, and coupler 828 coupled to substrate 852. Interface converter paddle 854 may support two ports of 4× InfiniBand. Transceivers 820 may comprise two 4× parallel optics Multisource Agreement (MSA) compliant transceivers.

Figure 24:
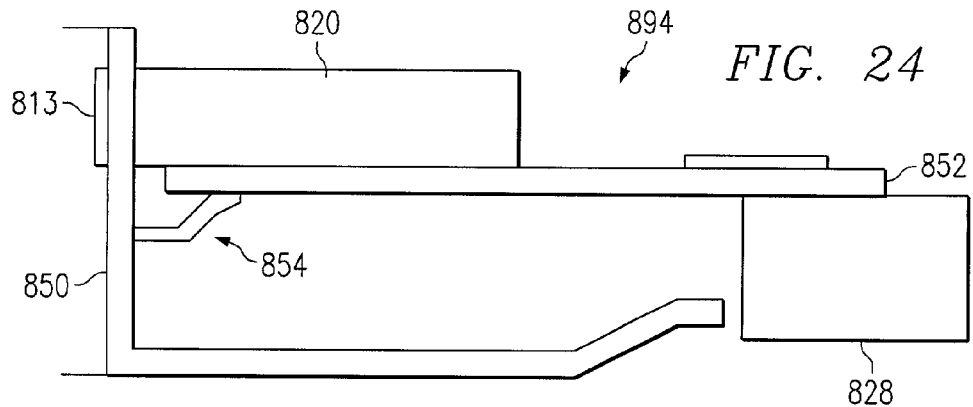
FIG. 24 is a side view of the interface converter paddle of FIG. 23.

FIG. 24 is a side view of interface converter paddle 894 of FIG. 23. Interface converter paddle 894 includes status indicators 854.

Figure 25:
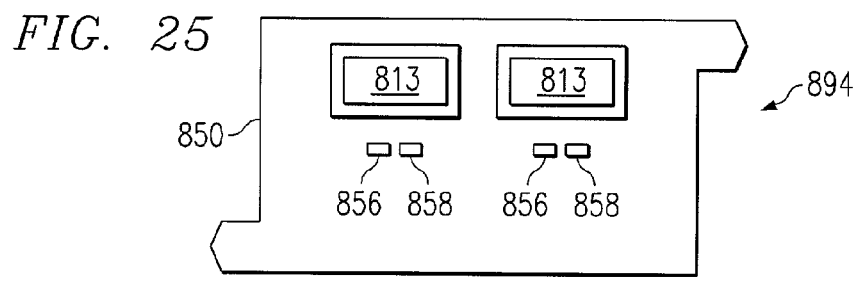
FIG. 25 is an input-side view of the interface converter paddle of FIG. 23.

FIG. 25 is an input-side view of interface converter paddle 894 of FIG. 23. Input side panel 850 includes ports 813, activity indicators 856, and fault indicators 858.

Figure 26:
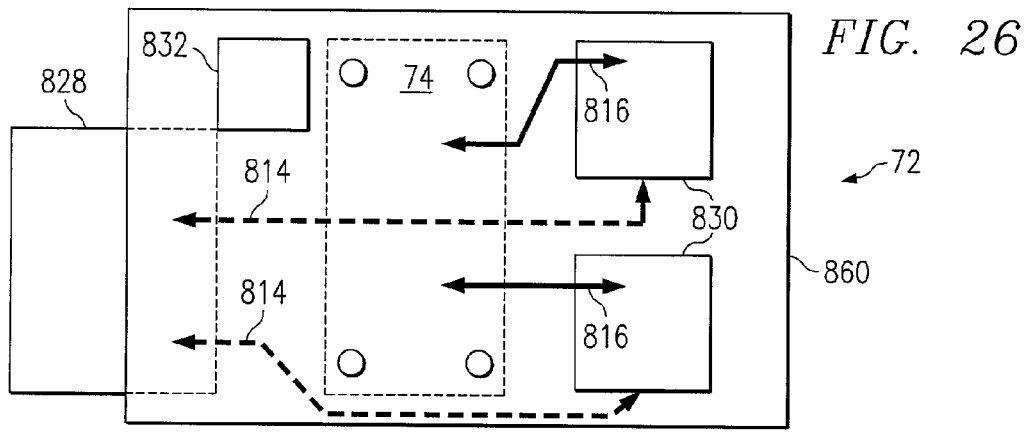
FIG. 26 is a top view of an example of a physical layer card.

FIG. 26 is a top view of an example of physical layer card 72. Physical layer card 72 includes programmable logic device 832 and serdes 830. Physical layer card 72 is coupled to high speed coupler 828 and coupler 74. Serdes 830 receive serial data signals 814 from high speed coupler 828. Serdes 830 transforms serial data signals 814 into parallel data signals 816. Parallel data signals 816 are transmitted through coupler 74 to line card 54.

Figure 27:
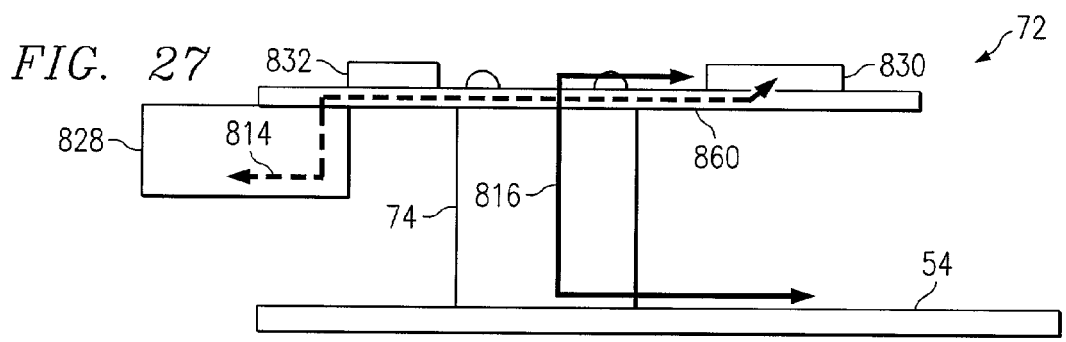
FIG. 27 is a side view of the physical layer card of FIG. 26.

FIG. 27 is a side view of physical layer card 72 of FIG. 26. Serdes 830 is displaced outwardly from line card 54. According to one embodiment, serdes 830 may be displaced a distance of approximately 0.5 to one inch, for example, 0.675 inches, from line card 54.

Figure 28:
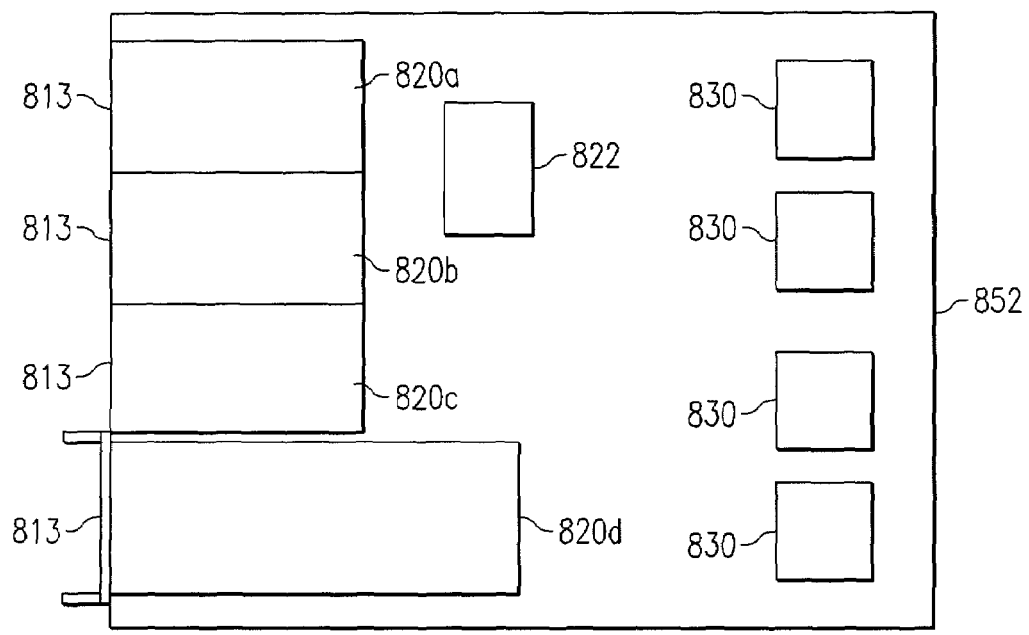
FIG. 28 is a top view of another example of an interface converter paddle.

FIG. 28 is a top view of a fourth exemplary embodiment of an interface converter paddle 900. Interface converter paddle 900 includes transceivers 820 with ports 813, programmable logic device 822, and serdes 830 coupled to substrate 852. Interface converter paddle 900 may support four 10G ports. Transceivers 820a–c may comprise XGP Multisource Agreement (XGP MSA) transceivers, and transceiver 820d may comprise a XENPAK Multisource Agreement (XENPAK MSA) transceiver.

Figure 29:
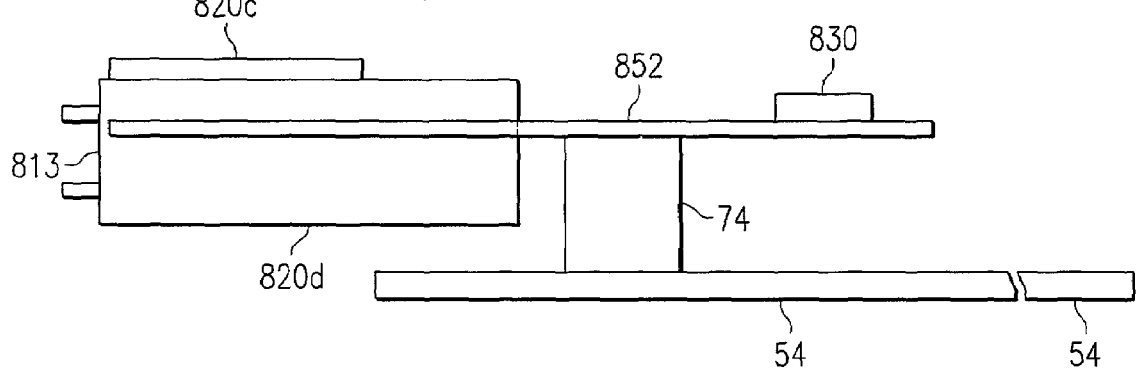
FIG. 29 is a side view of the interface converter paddle of FIG. 28.

FIG. 29 is a side view of interface converter paddle 900 of FIG. 28. According to one embodiment, substrate 852 is coupled directly to coupler 74 of line card board 54.

Figure 30:
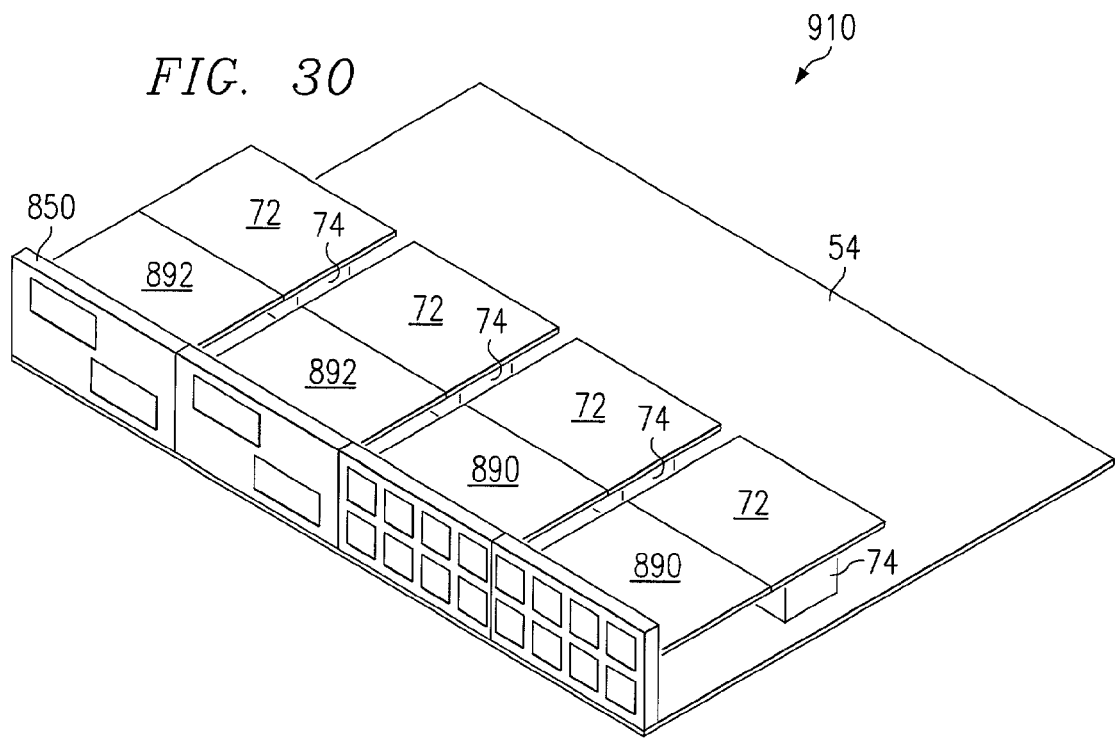
FIG. 30 illustrates an example of a system for converting data signals.

FIG. 30 illustrates an example of a system 910 for converting data signals. System 910 includes interface converter paddles 890 of FIG. 17 and interface converter paddles 892 of FIG. 20. Physical layer cards 72 couple interface converter paddles 890 and 892 to coupler 74 of line card board 54.

Figure 31:
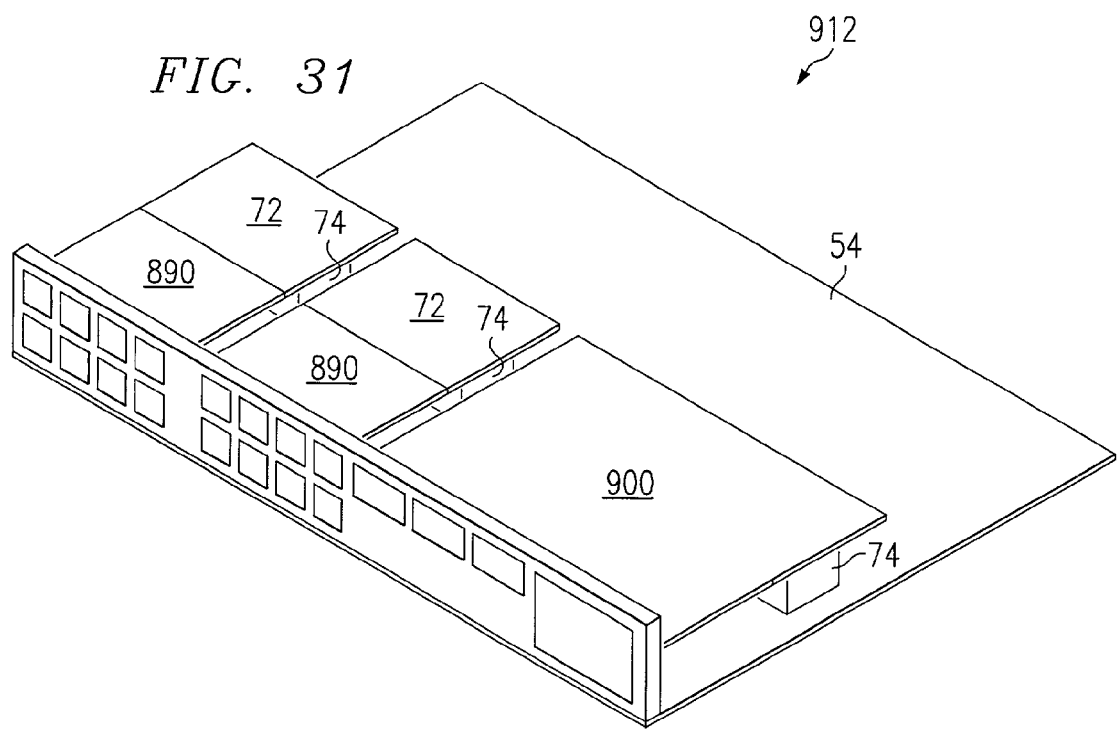
FIG. 31 illustrates another example of a system for converting data signals.

FIG. 31 illustrates another example of a system 912 for converting data signals. System 912 includes interface converter paddles 890 of FIG. 17 and interface converter paddle 900 of FIG. 28. Physical layer cards 72 couple interface converter paddles 890 to coupler 74 of line card board 54, while interface converter paddle 900 is coupled directly to coupler 74.

Certain embodiments of the invention may provide technical advantages. A technical advantage of one embodiment may be that interface converter paddles allow for data communication according to any of a number of communication protocols. Interface converter paddles may each convert data signals according to a different communication protocol. Any of the interface converter paddles may be coupled to a physical layer card that can process data signals received from the interface converter card. Thus, the embodiment may provide for processing data according to different communication protocols by interchanging the interface converter paddles. Another technical advantage of one embodiment may be that a board surface controller controls the operations of the interface converter paddle and the physical layer card in order to process data signals according to the different communication protocols. The board surface controller centralizes command functions, which may allow for efficient implementation of changes within the system.

Although an embodiment of the invention and its advantages are described in detail, a person skilled in the art could make various alterations, additions, and omissions without departing from the spirit and scope of the present invention as defined by the appended claims.

What is claimed is:

1. An apparatus for converting data signals, comprising:
an input operable to:
  receive a plurality of data signals from a first interface converter paddle associated with a first communication protocol; and
  receive a plurality of data signals from a second interface converter paddle associated with a second communication protocol; and
a serdes coupled to the input and operable to:
  determine whether a coupled interface converter paddle coupled to the serdes comprises the first interface converter paddle or the second interface converter paddle;
  identify the communication protocol associated with the coupled interface converter paddle;
  receive a plurality of data signals from the coupled interface converter paddle, the data signals being serialized; and
  deserialize the data signals according to the identified communication protocol.

2. The apparatus of claim 1, wherein the serdes is operable to:
receive a plurality of outgoing data signals from a line card; and
serialize the outgoing data signals according to the identified communication protcol.

3. The apparatus of claim 1, wherein the coupled interface converter paddle comprises a transceiver operable to:
transform the data signals from an optical form to an electrical form;
transmit the data signals to the serdes;
receive a plurality of outgoing data signals from the serdes; and
transform the outgoing data signals from an electrical form to an optical form.

4. The apparatus of claim 1, wherein the coupled interface converter paddle comprises a transceiver operable to:
transmit the data signals to the serdes, the data signals comprising a plurality of electrical signals; and
receive a plurality of outgoing data signals from the serdes, the outgoing data signals comprising a plurality of electrical signals.

5. An apparatus for converting data signals, comprising:
an input operable to:
  receive a plurality of data signals from a first interface converter paddle associated with a first communication protocol; and
  receive a plurality of data signals from a second interface converter paddle associated with a second communication protocol; and
a serdes coupled to the input and operable to:
  determine whether a coupled interface converter paddle coupled to the serdes comprises the final interface converter paddle or the second interface converter paddle; wherein the coupled interface converter paddle comprises a high speed coupler operable to be hot-plugged to the serdes;

identify the communication protocol associated with the coupled interface converter paddle;
receive a plurality of data signals from the coupled interface converter paddle, the data signals being serialized; and
deserialize the data signals according to the identified communication protocol.

6. The apparatus of claim 1, wherein the serdes is operable to adjust a speed of the data signals to a generic speed.

7. The apparatus of claim 1, further comprising a board surface controller coupled to the serdes and operable to:
determine the identified communication protocol; and
instruct the serdes to process the data signals according to the identified communication protocol.

8. The apparatus of claim 1, further comprising a status indicator operable to indicate a status of the device signals.

9. The apparatus of claim 1, wherein the serdes is operable to transmit the data signals to a line card, the serdes disposed outwardly from the line card.

10. A system for converting data signals, comprising:
a first interface converter paddle associated with a first communication protocol;
a second interface converter paddle associated with a second communication protocol; and
a physical layer card operable to:
determine whether a coupled interface converter paddle coupled to the physical layer card comprises the first interface converter paddle or the second interface converter paddle;
identify the communication protocol associated with the coupled interface converter paddle;
receive a plurality of data signals from the coupled interface converter paddle, the data signals being serialized; and
deserialize the data signals according to the identified communication protocol.

11. The system of claim 10, wherein the physical layer card is operable to:
receive a plurality of outgoing data signals from a line card; and
serialize the outgoing data signals according to the identified communication protocol.

12. The system of claim 10, wherein the coupled interface converter paddle comprises a transceiver operable to:
transform the data signals from an optical form to an electrical form;
transmit the data signals to the physical layer card;
receive a plurality of outgoing data signals from the physical layer card; and
transform the outgoing data signals from an electrical form to an optical form.

13. The system of claim 10, wherein the coupled interface converter paddle comprises a transceiver operable to:
transmit the data signals to the serdes, the data signals comprising a plurality of electrical signals; and
receive a plurality of outgoing data signals from the serdes, the outgoing data signals comprising a plurality of electrical signals.

14. A system for converting data signals, comprising:
a first interface converter paddle associated with a first communication protocol;
a second interface converter paddle associated with a second communication protocol; and
a physical layer card operable to:
determine whether a coupled interface converter paddle coupled to the physical layer card comprises the first interface converter paddle of the second interface convener paddle; wherein the coupled interface converter paddle comprises a high speed coupler operable to be hot-plugged to the serdes;
identify the communication protocol associated with the coupled interface converter paddle;
receive a plurality of data signals from the coupled interface converter paddle, the data signals being serialized; and
deserialize the data signals according to the identified communication protocol.

15. The system of claim 10, wherein the physical layer card is operable to adjust a speed of the data signals to a genetic speed.

16. The system of claim 10, further comprising a line card comprising a board surface controller operable to:
determine the identified communication protocol; and
instruct the physical layer card to process the data signals according to the identified communication protocol.

17. The system of claim 10, further comprising a status indicator operable to indicate a status of the data signals.

18. The system of claim 10, wherein the physical layer card is operable to transmit the data signals to a line card, the physical layer card disposed outwardly from the line card.

19. A method for converting data signals, comprising:
determining whether a coupled interface converter paddle coupled to a serdes comprises a first interface converter paddle or a second interface converter paddle, the first interface converter paddle associated with a first communication protocol, the second interface converter paddle associated with a second communication protocol;
identifying the communication protocol associated with the coupled interface converter paddle;
receiving a plurality of data signals from the coupled interface converter paddle; and
deserializing the data signals according to the identified communication protocol.

20. The method of claim 19, further comprising:
receiving a plurality of outgoing data signals from a line card; and
serializing the outgoing data signals according to the identified communication protocol.

21. The method of claim 19, further comprising:
transforming the data signals from an optical form to an electrical form;
transmitting the data signals to the serdes;
receiving a plurality of outgoing data signals from the serdes; and
transforming the outgoing data signals from an electrical form to an optical form.

22. The method of claim 19, further comprising:
transmitting the data signals to the serdes, the data signals comprising a plurality of electrical signals; and
receiving a plurality of outgoing data signals from the serdes, the outgoing data signals comprising a plurality of electrical signals.

23. A method for converting data signals, comprising:
determining whether a coupled interface converter paddle coupled to a serdes comprises a first interface converter paddle or a second interface converter paddle, the first interface converter paddle associated with a first communication protocol, the second interface converter paddle associated with a second communication protocol;
hot-plugging a high speed coupler of the coupled interface converter paddle to the serdes;

identifying the communication protocol associated with the coupled interface converter paddle;
receiving a plurality of data signals from the coupled interface converter paddle; and
deserializing the data signals according to the identified communication protocol.

24. The method of claim 19, further comprising adjusting a speed of the data signals to a generic speed.

25. The method of claim 19, further comprising:
determining the identified communication protocol using a board surface controller; and
transmitting an instruction from the board surface controller to the serdes to process the data signals according to the identified communication protocol.

26. The method of claim 19, further comprising indicating a status of the data signals.

27. The method of claim 19, further comprising transmitting the data signals to a line card, the serdes disposed outwardly from the line card.

28. Logic for converting data signals, the logic embodied in a computer-readable medium and operable to:
determine whether a coupled interface converter paddle coupled to a serdes comprises a first interface converter paddle or a second interface converter paddle, the first interface converter paddle associated with a first communication protocol, the second interface converter paddle associated with a second communication protocol;
identify the communication protocol associated with the coupled interface converter paddle;
receive a plurality of data signals from the coupled interface converter paddle; and
deserialize the data signals according to the identified communication protocol.

29. The logic of claim 28, wherein the logic is further operable to:
receive a plurality of outgoing data signals from a line card; and
serialize the outgoing data signals according to the identified communication protocol.

30. The logic of claim 28, wherein the logic is further operable to:
transform the data signals from an optical form to an electrical form;
transmit the data signals to the serdes;
receive a plurality of outgoing data signals from the serdes; and
transform the outgoing data signals from an electrical form to an optical form.

31. The logic of claim 28, wherein the logic is further operable to:
transmit the data signals to the serdes, the data signals comprising a plurality of electrical signals; and
receive a plurality of outgoing data signals from the serdes, the outgoing data signals comprising a plurality of electrical signals.

32. Logic for converting data signals, the logic embodied in a computer-readable medium and operable to:
determine whether a coupled interface converter paddle coupled to a serdes comprises a first interface converter paddle or a second interface converter paddle, the first interface converter paddle associated with a first communication protocol, the second interface converter paddle associated with a second communication protocol; wherein the logic is further operable to hot-plug a high speed coupler of the coupled interface converter paddle to the serdes;
identify the communication protocol associated with the coupled interface converter paddle;
receive a plurality of data signals from the coupled interface converter paddle; and
deserialize the data signals according to the identified communication protocol.

33. The logic of claim 28, wherein the logic is further operable to adjust a speed of the data signals to a generic speed.

34. The logic of claim 28, wherein the logic is further operable to:
determine the identified communication protocol using a board surface controller; and
transmit an instruction from the broad surface controller to the serdes to process the data signals according to the identified communication protocol.

35. The logic of claim 28, wherein the logic is further operable to indicate a status of the data signals.

36. The logic of claim 28, wherein the logic is further operable to transmit the data signals to a line card, the serdes disposed outwardly from the line card.

37. A system for converting data signals, comprising:
means for determining whether a coupled interface converter paddle coupled to a serdes comprises a first interface converter paddle or a second interface converter paddle, the first interface converter paddle associated with a first communication protocol, the second interface converter paddle associated with a second communication protocol;
means for identifying the communication protocol associated with the coupled interface converter paddle;
means for receiving a plurality of data signals from the coupled interface converter paddle; and
means for deserializing the data signals according to the identified communication protocol.

38. A system for converting data signals, comprising:
a first interface converter paddle associated with a first communication protocol;
a second interface converter paddle associated with a second communication protocol;
a physical layer card operable to:
determine whether a coupled interface converter paddle coupled to the physical layer card comprises the first interface converter paddle or the second interface converter paddle;
identify the communication protocol associated with the coupled interface converter paddle;
receive a plurality of data signals from the coupled interface converter paddle, the data signals being serialized;
deserialize the data signals according to the identified communication protocol;
adjust a speed of the data signals to a generic speed;
transmit the data signals to a line card, the physical layer card disposed outwardly from the line card;
receive a plurality of outgoing data signals from the line card; and
serialize the outgoing data signals according to the identified communication protocol; and
a status indicator operable to indicate a status of the data signals, the coupled interface converter paddle comprising a transceiver operable to:
transform the data signals from an optical form to an electrical form;
transmit the data signals to the physical layer card;
receive a plurality of outgoing data signals from the physical layer card; and transform the outgoing data signals from an electrical from to an optical form, the line card comprising a board surface controller operable to:
determine the identified communication protocol; and
instruct the physical layer card to process the data signals according to the identified communication protocol.

39. A system for converting data signals, comprising:
a first interface converter paddle associated with a first communication protocol;
a second interface converter paddle associated with a second communication protocol;
a physical layer card operable to:
   determine whether a coupled interface converter paddle coupled to the physical layer card comprises the first interface converter paddle or the second interface converter paddle;
   identify the communication protocol associated with the coupled interface converter paddle;
   receive a plurality of first data signals from the coupled interface converter paddle, the data signals being serialized;
   deserialize the first data signals according to the identified communication protocol; and
   transmit the first data signals to a line card coupled to the physical layer card; and
a third interface converter paddle associated with a third communication protocol and operable to:
   receive a plurality of second data signals;
   deserialize the second data signals according to the third communication protocol; and
   transmit the second data signals to the line card, the line card coupled to the third interface converter paddle.

40. The system of claim 39, wherein the physical layer card is operable to:
receive a plurality of outgoing data signals from the line card; and
serialize the outgoing data signals according to the identified communication protocol.

41. The system of claim 39, wherein the coupled interface converter paddle comprises a transceiver operable to:
transform the first data signals from an optical form to an electrical form;
transmit the first data signals to the physical layer card;
receive a plurality of outgoing data signals from the physical layer card; and
transform the outgoing data signals from an electrical form to an optical form.

42. The system of claim 38, wherein the coupled interface converter paddle comprises a transceiver operable to:
transmit the first data signals to the serdes, the first data signals comprising a plurality of electrical signals; and
receive a plurality of outgoing data signals from the serdes, the outgoing data signals comprising a plurality of electrical signals.

43. The system of claim 39, wherein the coupled interface converter paddle comprises a high speed coupler operable to be hot-plugged to the serdes.

44. The system of claim 39, wherein the third interface converter paddle comprises a transceiver operable to:
transform the second data signals from an optical form to an electrical form;
transmit the second data signals to the physical layer card;
receive a plurality of outgoing data signals from the physical layer card; and
transform the outgoing data signals from an electrical form to an optical form.

45. The system of claim 39, wherein the third interface converter paddle comprises a transceiver operable to:
transmit the second data signals to the serdes, the second data signals comprising a plurality of electrical signals; and
receive a plurality of outgoing data signals from the serdes, the outgoing data signals comprising a plurality of electrical signals.

46. The system of claim 39, wherein the third interface converter paddle comprises a high speed coupler operable to be hot-plugged to the serdes.

* * * * *

UNITED STATES PATENT AND TRADEMARK OFFICE
CERTIFICATE OF CORRECTION

PATENT NO. : 7,133,416 B1  Page 1 of 2
APPLICATION NO. : 10/091916
DATED : November 7, 2006
INVENTOR(S) : Chamdani et al.

It is certified that error appears in the above-identified patent and that said Letters Patent is hereby corrected as shown below:

Column 1, line 67, delete "communication" and insert --communicating--, therefor.
Column 2, line 4, before "-m5", delete "m5".
Column 3, line 16, delete "of" and insert --or,--, therefor.
Column 3, line 21, delete "of" and insert --or--, therefor.
Column 3, line 26, delete "of" and insert --or--, therefor.
Column 3, line 27, delete "of" and insert --or--, therefor.
Column 3, line 35, before "Fibre" insert --a--.
Column 3, line 38, delete "database" and insert --databases--, therefor.
Column 3, line 54, delete "of" and insert --or--, therefor.
Column 3, line 63, delete "or" and insert --of--, therefor.
Column 4, line 45, delete "conversations" and insert --conversions--, therefor.
Column 5, line 58, delete "Table" and insert --Tables--, therefor.
Column 6, line 24, delete "60." and insert --70.--, therefor.
Column 6, line 45, delete "of" and insert --to--, therefor.
Column 6, line 56, after "At step" delete "At step".
Column 6, line 59, delete "AT" and insert --At--, therefor.
Column 7, line 4, after "receive" insert --link--.
Column 9, line 16, delete "blocks" and insert --block--, therefor.
Column 12, line 64, delete "different" and insert --differential--, therefor.
Column 13, line 1, delete "3.187" and insert --3.1875--, therefor.
Column 13, line 15, delete "statue" and insert --status--, therefor.
Column 13, line 16, delete "554" and insert --854--, therefor.
Column 13, line 55, delete "Gps." and insert --Gbps.--, therefor.
Column 13, line 67, delete "72" and insert --70--, therefor.
Column 14, line 24, delete "or" and insert --of--, therefor.
Column 14, line 58, delete "843" and insert --854--, therefor.
Column 16, line 35, delete "protcol." and insert --protocol.--, therefor.
Column 16, line 63, delete "final" and insert --first--, therefor.
Column 17, line 16, delete "device" and insert --data--, therefor.
Column 18, line 1, delete "convener" and insert --converter--, therefor.
Column 18, line 13, delete "genetic" and insert --generic--, therefor.

Signed and Sealed this

Twenty-seventh Day of April, 2010

David J. Kappos
*Director of the United States Patent and Trademark Office*

Column 20, line 14, delete "broad" and insert --board--, therefor.
Column 21, line 2, delete "from" and insert --form--, therefor.
Column 22, line 8, delete "38," and insert --39,--, therefor.